United States Patent
Nishimori

[19]

[11] Patent Number: 5,982,810
[45] Date of Patent: Nov. 9, 1999

[54] SIGNAL EXTRACTION CIRCUIT AND CORRELATOR UTILIZING THE CIRCUIT

[75] Inventor: Eiji Nishimori, Kamifukuoka, Japan

[73] Assignee: New Japan Radio Co., Ltd., Tokyo, Japan

[21] Appl. No.: 08/831,772

[22] Filed: Apr. 2, 1997

[30] Foreign Application Priority Data

Apr. 4, 1996 [JP] Japan ................................. 8-106469
Sep. 27, 1996 [JP] Japan ................................. 8-277390

[51] Int. Cl.⁶ ........................ H04B 15/00; H04K 1/00; H04L 27/30
[52] U.S. Cl. ................... 375/208; 375/200; 375/209; 370/342; 370/515
[58] Field of Search ........................ 375/200, 208–209; 370/350, 515, 342; 364/819, 822, 724, 728

[56] References Cited

U.S. PATENT DOCUMENTS

| | | | |
|---|---|---|---|
| 3,715,508 | 2/1973 | Blasbalg | 375/232 |
| 4,255,791 | 3/1981 | Martin | 364/514 |
| 5,099,495 | 3/1992 | Mikoshiba et al. | 375/200 |
| 5,619,527 | 4/1997 | Kuroyanagi et al. | 375/206 |
| 5,677,927 | 10/1997 | Fullerton et al. | 375/200 |
| 5,677,930 | 10/1997 | Bottomley | 375/208 |

*Primary Examiner*—Stephen Chin
*Assistant Examiner*—Michael W Maddox
*Attorney, Agent, or Firm*—Armstrong, Westerman, Hattori, McLeland & Naughton

[57] ABSTRACT

A correlator used for spread spectrum communications which reduces consumed power. A signal extraction circuit (6) is provided for directly extracting phase information from an input signal which expresses two values of code data by each phase of a plurality of cycles. A signal transferring circuit (1) is connected to the signal extraction circuit (6) for transferring the phase information to a multiplying circuit (2) comprised of a plurality of multipliers. Signals in each cell of the signal transferring circuit (1) are multiplied by fixed coefficients within the multiplying circuit (2) and supplied to an adding circuit (3) for determination of a correlation peak value.

16 Claims, 19 Drawing Sheets

FIG.11
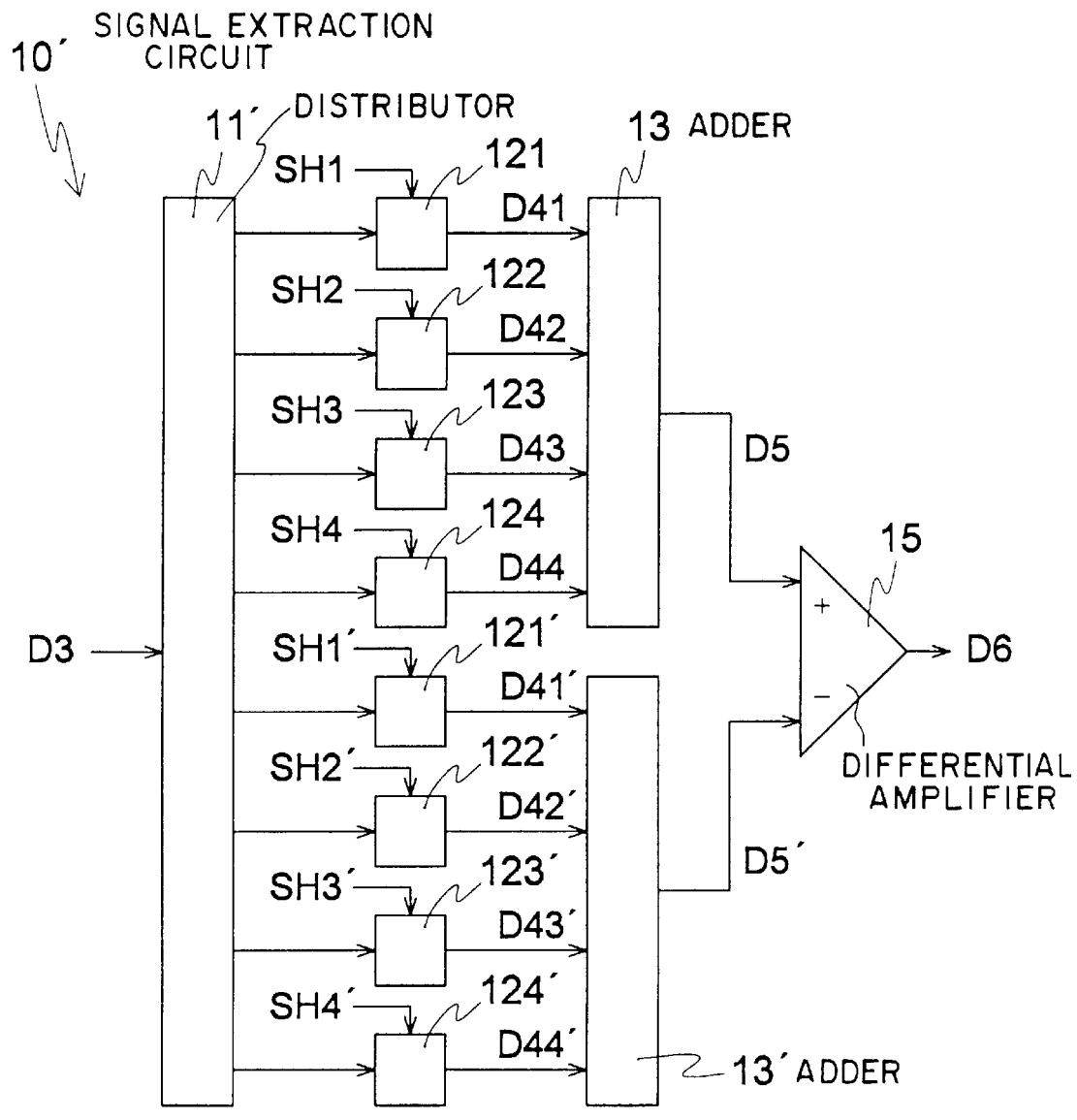
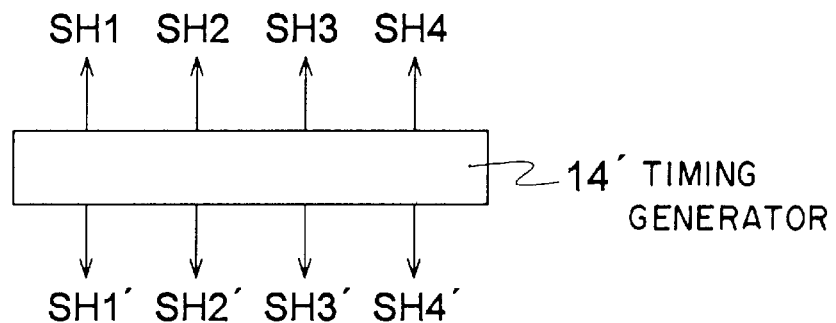

SIGNAL EXTRACTION CIRCUIT AND CORRELATOR UTILIZING THE CIRCUIT

BACKGROUND OF THE INVENTION

1. Field of the Invention

The present invention relates to a correlator which is used in spread spectrum communications, and more particularly, to a correlator with a reduced amount of consumed power (hereinafter referred to as "consumed power") by reducing circuit scale. Still more particularly, the present invention relates to a signal extraction circuit for directly drawing out phase information from an input signal which expresses two values ("1", "0") of code data by each phase of a plurality of cycles and a correlator of spread spectrum communications utilizing circuit.

2. Description of the Related Art

FIG. 18 is a schematic view showing waveforms of signals to be processed on transmitting side in a spread spectrum communications. FIG. 19 is a block diagram showing one example of a conventional correlator.

In spread spectrum communications, original transmitted baseband data D1 are multiplied by code data in PN (pseudo noise) code sequence (hereinafter referred to as "PN code data D2", and where, "0" of transmitted baseband data D1 is assumed to be −1), and multiplication data (transmitted baseband data D1×PN code data D2) is BPSK (binary phase shift keying) modulated to transmission signal D3, and is sent out to transmission path on the transmission side as shown in FIG. 18.

The PN code data D2 is "1" of transmitted baseband data D1 converted to, for example, the data of multiple bits (for example, 32 bits) of "1" and "0". "1" or "0" of this PN code data is called "chip" in spread spectrum communications. In BPSK modulation, the phase of the carrier is reversed at the leading edge and the trailing edge of PN code data D2, and "1" or "0" information of PN code data D2 is the transmission signal D3 expressed by the phase. To transmission signal D3, for example, 190 cycles are allocated per 1 chip of PN code data D2. Presently, if the signaling rate of transmitted baseband data D1 is 1 Mbps, chip rate of the PN code data D2 is 13 Mcps, chip length is 11 chips, and carrier frequency of transmission signal D3 is 2.4 GHz band.

On the receiving side, the above-mentioned transmission signal D3 is received, and using a frequency converter (not illustrated) such as down converter, etc., removing components of the carrier frequency and converted into signal corresponding to value of each chip of PN code data D2, and inputted into a correlator of a configuration as shown in FIG. 19 to demodulate and reproduce transmitted baseband data D1.

In the correlator shown in FIG. 19, numeral 1 is a signal transferring means utilizing CCD (charge coupled device), etc., where a signal having the components of the carrier frequency removed from inputted transmission signal D3 is taken in successively as data expressed by two values by clock signal φ1 of the frequency same as the chip rate of PN code data D2, and is outputted from each cell 1a while being transferred to each cell 1a of the signal transferring means 1. The two values are positive peak (+1) and negative peak (−1). The data (+1, −1) outputted from each cell 1a is multiplied by coefficient ("1" denoted to +1 and "0" denoted to −1) of the PN code (code corresponding to PN code data D2) previously set to each multiplier 2a.

Consequently, at the timing in which the data on the same list of coefficient of PN code data D2 are outputted from each cell 1a of the signal transferring means 1, multiplication result of each multiplier 2a becomes 1 (=+1×+1=−1×−1), and adding these by an adding means 3 causes addition output to achieve the peak value (correlation peak). For example, if chip length is 32 chips and number of cells of signal transferring means 1 is 32, the value of the correlation peak is 32.

Now, PN code data D2 corresponding to "0" of transmitted baseband data D1 is each reversed bit of PN code data D2, which corresponds to "1" of transmitted baseband data D1. Consequently, at the timing in which the same data as that of list of PN code data D2 corresponding to "0" of this transmitted baseband data D1 is taken in, multiplication result of each multiplier 2a is −1 (=+1×−1) and these are added at adding means 3, then peak value becomes negative. If the number of cells 1a is 32 as with the above-mentioned case, the value of the correlation peak is −32.

The correlation peak obtained from adding means 3, as described above, is identified as "1" when the correlation peak is positive and as "0" when it is negative, and restored and reproduced to the above-mentioned transmitted baseband data D1, and outputted to subsequent stage. As described above, by setting on correlator side a multiplication coefficient corresponding to PN code data D2 on the transmitting side, it is possible to take in transmitted baseband data D1 identified by relevant PN code data D2.

Data showing the correlation peak are inputted to a synchronous signal generator means 5, and clock signal generator means 4 is controlled by synchronous signal obtained in synchronous signal generator means 5, and phase of clock signal φ1 is controlled so as to match the phase of transmission signal D3.

By the way, as described above, because modulated transmission signal D3 has an extremely high carrier frequency, if it is inputted as it is into the correlator, clock signal φ1 operating the correlator must be matched to the frequency, but this may exceed the operating frequency limit of signal transferring means 1, and in addition, the number of cells 1a of signal transferring means 1 becomes enormous, resulting in extremely large power consumption.

Therefore, hitherto, as described above, transmission signal D3 has components of the carrier frequency removed first and converted to a signal correspond to PN code data by the frequency converter, and then taken in the correlator, but passing the signal to the frequency converter distorts waveforms by intermodulation, generates errors in extracting the transmitted baseband data D1 or requires a frequency converter, causing a problem of increased circuit scale.

Under these circumstances, the principal object of the present invention is to provide a signal extraction circuit which directly takes out phase information from the input signal expressing the two values of code data with the phase of a plurality of cycles and does not require a frequency converter, and a correlator that utilizes such signal extraction circuit. The other object of the present invention is to provide a correlator which does not need a frequency converter and which is designed to reduce consumed power.

SUMMARY OF THE INVENTION

According to the first aspect of the present invention, there is provided a correlator comprising:

a signal extraction means for directly extracting a phase information from an input signal which expresses two values of code data by each phase of a plurality of cycles;

a signal transferring means for transferring the phase information obtained in the signal extraction means;

a multiplying means having a plurality of multipliers wherein fixed coefficients are multiplied by signals obtained in each cell of the signal transferring means; and an adding means for adding results obtained in each multiplier of the multiplying means.

With the correlator of the second aspect of the present invention, wherein the signal extration means executes either of a step for extracting and outputting a signal of half cycle of a signal in every one period of input data, the signal expressing two values of code data, and a step for extracting signals of each half cycle of a plurality of signals in one period of an input data to collectively output the signals, each of the signals expressing two values of code data.

With the correlator of the third aspect of the present invention, wherein a frequency of clock signal for outputting the signal from the signal extraction means is the same frequency of clock signal for operating the signal transferring means, for extracting data from the signal extraction means at the same speed as that of extracting the code data.

With the correlator of the fourth aspect of the present invention, wherein the fixed coefficient of each multiplier of the multiplying means is weighted in accordance with transfer efficiency of the signal transferring means.

According to the fifth aspect of the present invention, there is provided a signal extraction circuit for directly extracting phase information from an input signal which expresses two values of code data by each phase of a plurality of cycles, the signal extraction circuit comprising:

a plurality of sample and hold circuits for sampling and holding separately the input signal; and an adder for adding output signals from the plurality of sample and hold circuits;

wherein a point other than zero cross point of the input signal is sampled and held by each of the sample and hold circuits, using each sample and hold signal which becomes active at timing shifted more than one unit, the one unit being equivalent to one cycle of the input signal; and wherein the adder generates a signal, the signal having the phase expressed by a polarity.

With the signal extraction circuit of the sixth aspect of the present invention, wherein another signal extraction circuit having the same elements as those of the signal extraction circuit is connected in parallel with an input portion of the signal extraction circuit, the another signal extraction circuit being operated by sample and hold signal shifting half cycle of the input signal against the sample and hold signal of the signal extraction circuit, and difference between an output signal of the signal extraction circuit and an output signal of the another signal extraction circuit is operated and outputted at a differential amplifier.

According to the seventh aspect of the present invention, there is provided a signal extraction circuit for directly extracting a phase information from an input signal which expresses two values of code data by each phase of a plurality of cycles, the signal extraction circuit comprising:

a plurality of sample and hold circuits connected with one another by cascade connection; and an adder for adding output signals from second stage to final stage of the plurality of sample and hold circuits;

wherein output signals of even stages of the plurality of sample and hold circuits are operated by a sample and hold signal of which frequency is the same as of the input signal, to be sampled and held at timing other than zero cross point; and wherein output signals of odd stages of the plurality of sample and hold circuits are operated by a sample and hold signal of which phase is reverse to a phase of the sample and hold signal.

With the signal extraction circuit of the eighth aspect of the present invention, wherein another signal extraction circuit having the same elements as those of the signal extraction circuit is connected in parallel with an input portion of the signal extraction circuit, the another signal extraction circuit being operated by sample and hold signal shifting half cycle of the input signal against the sample and hold signal of the signal extraction circuit, and difference between an output signal of the signal extraction circuit and an output signal of the another signal extraction circuit is operated and outputted at a differential amplifier.

According to the ninth aspect of the present invention, there is provided a signal extraction circuit for directly extracting a phase information from an input signal which expresses two values of code data by each phase of a plurality of cycles, the signal extraction circuit comprising:

a switching circuit opened and closed by a clock signal, frequency of the clock signal being the same as that of the input signal, said switching circuit extracting a signal equivalent to half cycle of the input signal;

an integrator for integrating a signal outputted from the switching circuit and reset every period correspondent to bit rate of the code data; and a sample and hold circuit for holding the signal just before resetting of the integrator.

With the signal extraction circuit of the tenth aspect of the present invention, wherein another signal extraction circuit having the same elements as those of the signal extraction circuit is connected in parallel with an input portion of the signal extraction circuit, the another signal extraction circuit being operated by clock signal shifting half cycle of the input signal against the clock signal of the signal extraction circuit, and difference between an output signal of the signal extraction circuit and an output signal of the another signal extraction circuit is operated and outputted at a differential amplifier.

According to the eleventh aspect of the present invention, there is provided a correlator comprising a signal extraction circuit for directly extracting a phase information from input signal which expresses two values of code data by phase of a plurality of cycles, a signal transferring means for transferring the obtained in the signal extraction circuit, a multiplying means having a plurality of multiplier, fixed coefficients of said multiplier being multiplied by signals obtained in each cell of the signal transferring means;

and an adding means for adding results obtained in each multiplier of the multiplying means, wherein the signal extraction circuit is composed of a signal extraction circuit of claim 5, the sample and hold signal is generated by an output signal of the adding means.

According to the twelfth aspect of the present invention, there is provided a correlator comprising a signal extraction circuit for directly extracting a phase information from input signal which expresses two values of code data by phase of a plurality of cycles, a signal transferring means for transferring the obtained in the signal extraction circuit, a multiplying means having a plurality of multiplier, fixed coefficients of said multiplier being multiplied by signals obtained in each cell of the signal transferring means;

and an adding means for adding results obtained in each multiplier of the multiplying means, wherein the signal extraction circuit is composed of a signal extraction circuit of claim 6, the sample and hold signal is generated by an output signal of the adding means.

According to the thirteenth aspect of the present invention, there is provided a correlator comprising a signal extraction circuit for directly extracting a phase information from input signal which expresses two values of code data by phase of a plurality of cycles, a signal transferring means for transferring the obtained in the signal extraction circuit, a multiplying means having a plurality of multiplier, fixed coefficients of said multiplier being multiplied by signals obtained in each cell of the signal transferring means;

and an adding means for adding results obtained in each multiplier of the multiplying means, wherein the signal extraction circuit is composed of a signal extraction circuit of claim 7, the sample and hold signal is generated by an output signal of the adding means.

According to the fourteenth aspect of the present invention, there is provided a correlator comprising a signal extraction circuit for directly extracting a phase information from input signal which expresses two values of code data by phase of a plurality of cycles, a signal transferring means for transferring the obtained in the signal extraction circuit, a multiplying means having a plurality of multiplier, fixed coefficients of said multiplier being multiplied by signals obtained in each cell of the signal transferring means;

and an adding means for adding results obtained in each multiplier of the multiplying means, wherein the signal extraction circuit is composed of a signal extraction circuit of claim 8, the sample and hold signal is generated by an output signal of the adding means.

According to the fifteenth aspect of the present invention, there is provided a correlator comprising a signal extraction circuit for directly extracting a phase information from input signal which expresses two values of code data by phase of a plurality of cycles, a signal transferring means for transferring the obtained in the signal extraction circuit, a multiplying means having a plurality of multiplier, fixed coefficients of said multiplier being multiplied by signals obtained in each cell of the signal transferring means;

and an adding means for adding results obtained in each multiplier of the multiplying means, wherein the signal extraction circuit is composed of a signal extraction circuit of claim 9, the clock signal is generated by an output signal of the adding means.

According to the sixteenth aspect of the present invention, there is provided a correlator comprising a signal extraction circuit for directly extracting a phase information from input signal which expresses two values of code data by phase of a plurality of cycles, a signal transferring means for transferring the obtained in the signal extraction circuit, a multiplying means having a plurality of multiplier, fixed coefficients of said multiplier being multiplied by signals obtained in each cell of the signal transferring means;

and an adding means for adding results obtained in each multiplier of the multiplying means, wherein the signal extraction circuit is composed of a signal extraction circuit of claim 10, the clock signal is generated by an output signal of the adding means.

BRIEF DESCRIPTION OF THE DRAWINGS

FIG. 11 is a block diagram showing the other embodiment of a signal extraction circuit according to this invention;

DETAILED DESCRIPTION

Now, one embodiment of a correlator according to this invention will be described.

Figure 1:
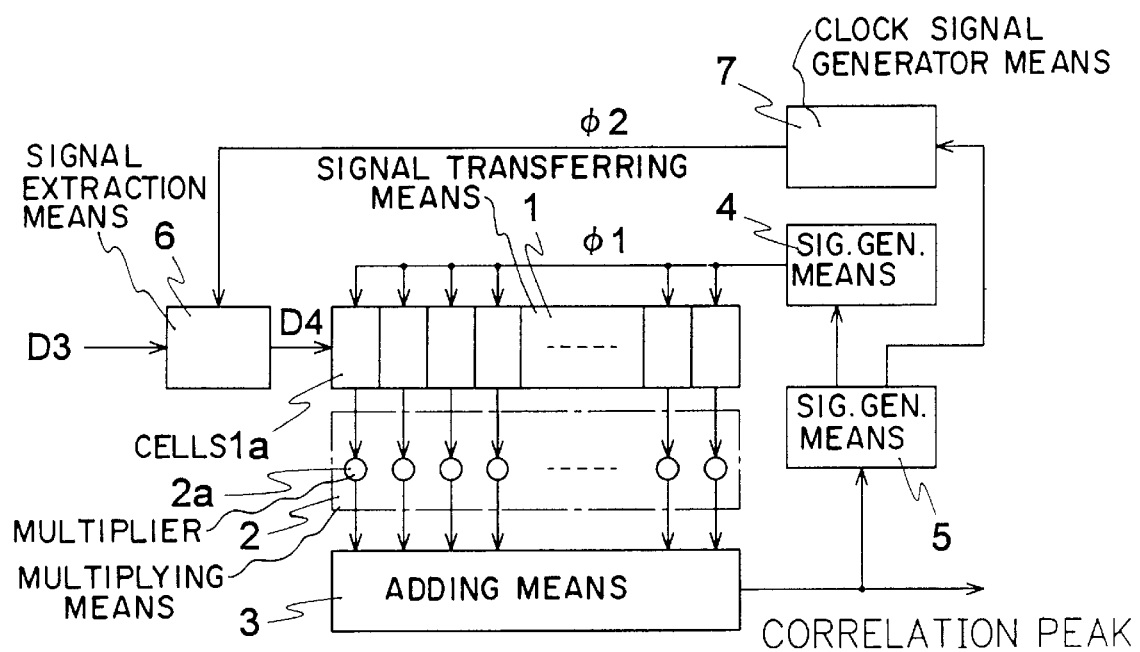
FIG. 1 is a block diagram showing one embodiment of a correlator according to this invention.
Figure 2:
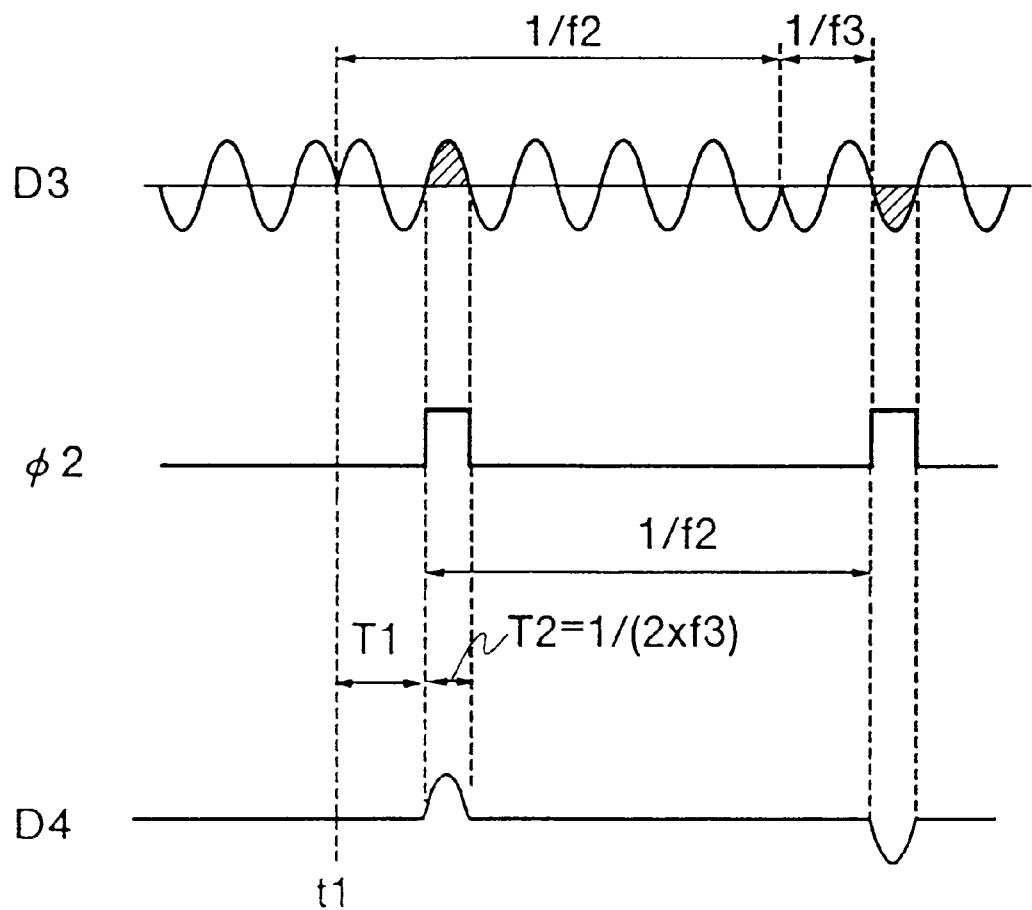
FIG. 2 is a timing chart showing waveforms for explaining operation of the signal extraction means shown in FIG. 1.
Figure 19:
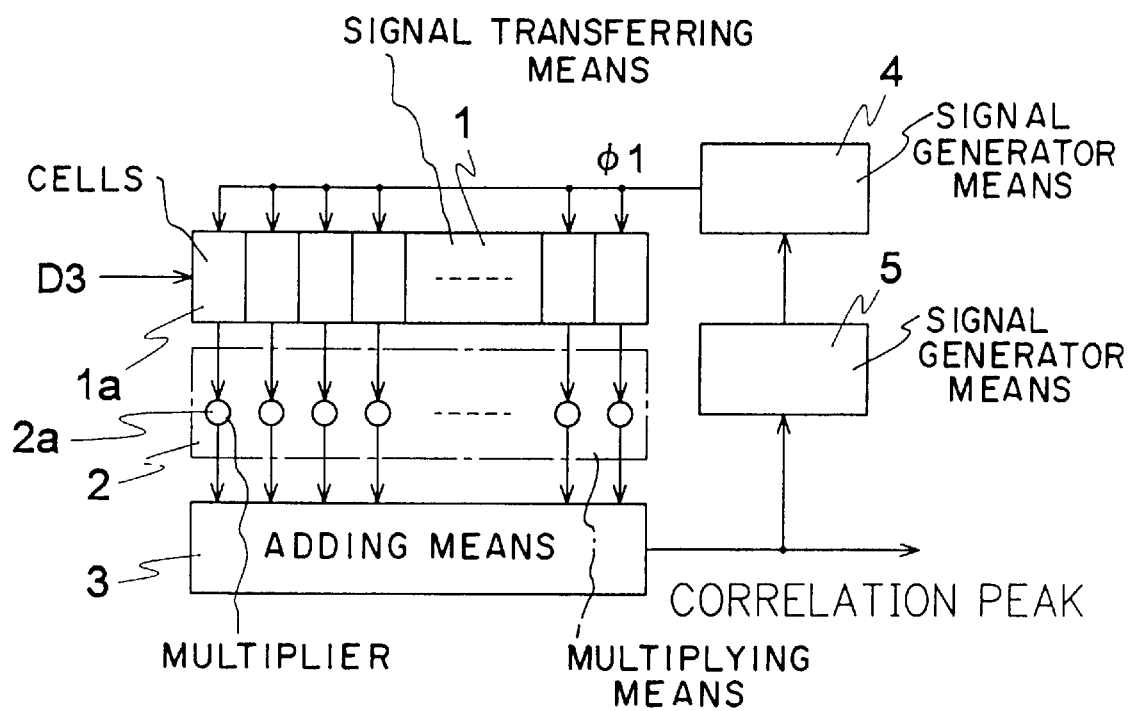
FIG. 19 is a block diagram showing one example of a conventional correlator.

FIG. 1 is a block diagram showing one embodiment of a correlator according to this invention. In FIG. 1, like elements shown in FIG. 19 are given like reference characters in FIG. 1 and detailed description will be omitted. FIG. 2 is a timing chart showing waveforms for explaining operation of the signal extraction means of the correlator shown in FIG. 1. In this embodiment, a signal extraction means 6 is provided in the stage before a signal transferring means 1, and a correlator is configured to extract the signal D4 showing the phase information of the transmission signal D3 in the signal extraction means 6 and send out the signal D4 to the signal transferring means 1.

In the signal extraction means 6, by the clock signal $\phi 2$ generated by the newly installed clock signal generator means 7, the signal D4 equivalent to one half cycle of one waveform of the waveforms of a plurality of cycles of entering transmission signal D3 is extracted and converted to a charge quantity (+1 signal or −1 signal). That is, because the transmission signal D3 is a signal with the phase reversed at the portion corresponding to the leading and trailing edges of the PN code data D2, as shown in FIG. 2, the period T2 equivalent to one half cycle of the transmission signal D3 from the time when time T1 passes from the phase reversing timing t1 is converted to the charge quantity.

The frequency of the clock signal $\phi 2$ which carried out this sampling is same as the chip rate f2 of the PN code data D2, and if the carrier frequency of the transmission signal D3 is denoted frequency f3, the pulse width T2 of the clock signal is $1/(2 \times f3)$. The time T1 before the pulse rises is set by controlling the phase of the clock signal $\phi 2$ by the synchronous signal generator means 5.

Based on the foregoing description, signal D4 to be inputted from the signal extraction means 6 to the signal transferring means 1 becomes data corresponding to data "1" or "0" of the PN code data D2 and same as described operation with FIG. 19 mentioned above, correlationship with the PN code data D2 is achieved, and the transmitted baseband data D1 is extracted.

In this embodiment, because the clock signal $\phi 2$ of the signal extraction means 6 is a signal different from the clock signal $\phi 1$ for driving the signal transferring means 1, the signal transferring means 1 is free from other influences, and the signal transferring means 1 is operated at the same speed as that of the chip rate of the PN code data D2 and the signal D4 at same speed as that of PN code data D2 can be extracted. Consequently, the number of cells 1a of the signal transferring means 1 on the subsequent stage can be the same as the chip length of the PN code data D2, enabling the operation at low consumed power.

Now, other embodiment of the correlator according to this invention will be described.

Figure 3:
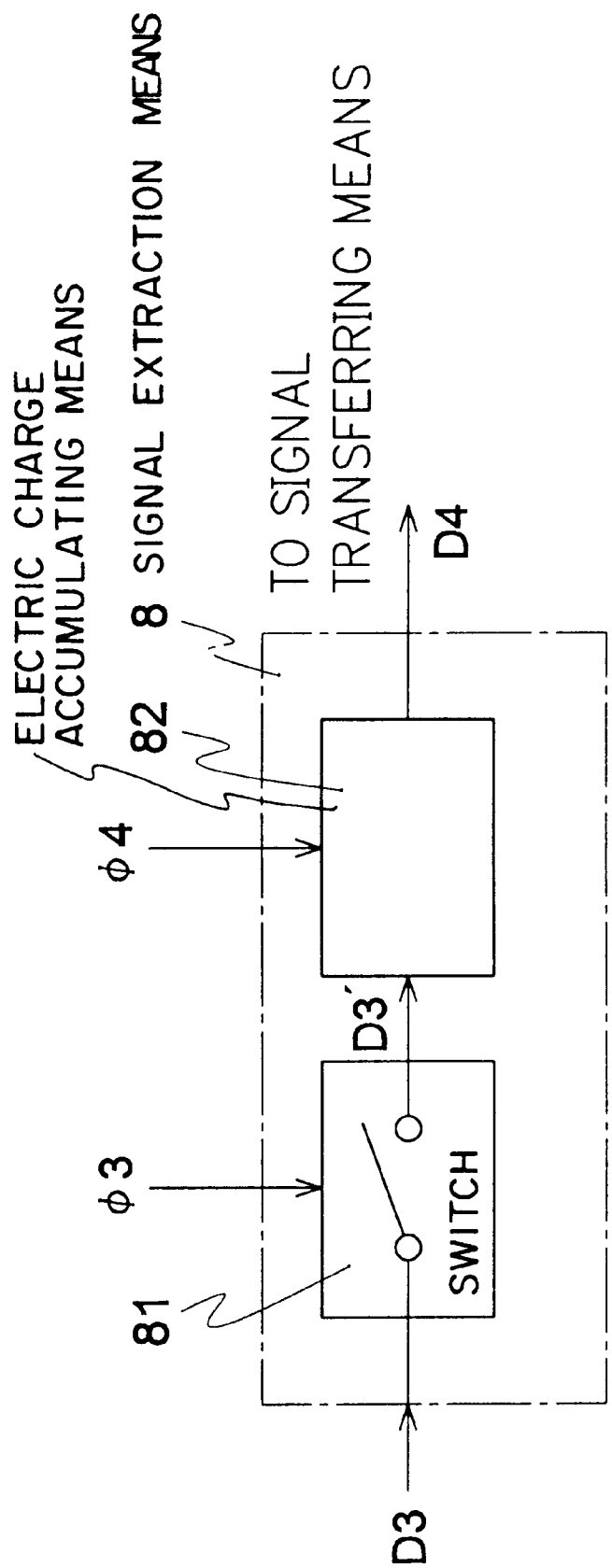
FIG. 3 is a block diagram showing a signal extraction means in the other embodiment of a correlator according to this invention.
Figure 4:
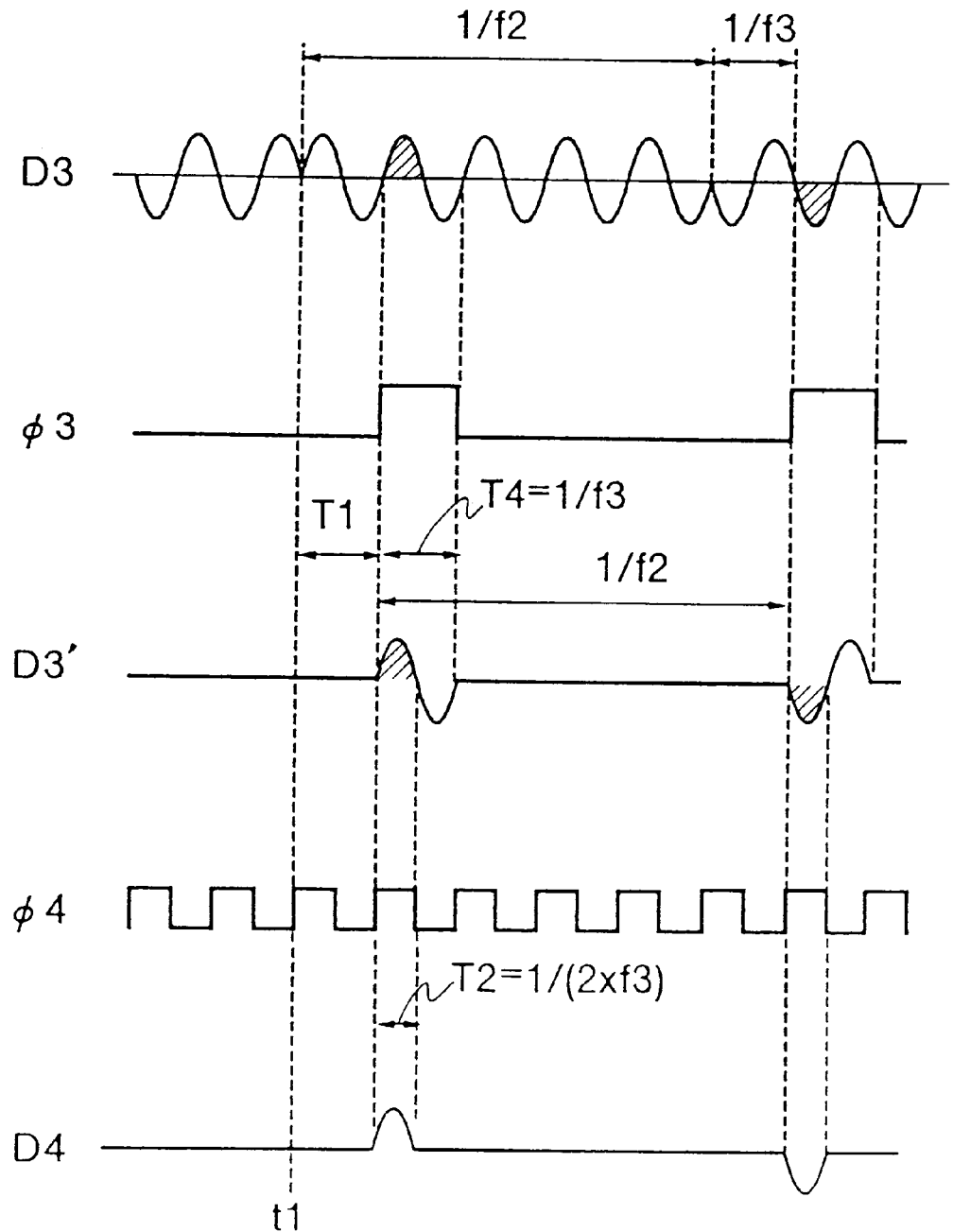
FIG. 4 is a timing chart showing waveforms for explaining operation of the signal extraction means shown in FIG. 3.

FIG. 3 is a block diagram showing the signal extraction means 8 in one embodiment of a correlator according to this invention. FIG. 4 is a timing chart showing waveforms for explaining operation of the signal extraction means of the correlator shown in FIG. 3. In this embodiment, the signal extraction means 8 comprises a switch 81 and an electric charge accumulating means 82. As shown in FIG. 4, in the switch 81, by the clock signal $\phi 3$, the waveform (in FIG. 4, shown by using code "D3'") equivalent to one cycle in the transmission signal D3 is taken in and the data of the first half cycle of the waveform of one cycle is sampled by the electric charge accumulating means 82 by the clock signal $\phi 4$, and the signal D4 is extracted.

The frequency of the clock signal $\phi 3$ that controls change-over the switch 81 is same as the frequency f2 of the PN code data D2. In addition, the pulse width T3 is made to be the reciprocal (1/f3) of the carrier frequency of the transmission signal D3, and the phase is adjusted to rise at time T1 from the edge of the PN code data D2. The frequency of clock signal $\phi 4$ for controlling the electric charge accumulating means 82 is the frequency f3 same as that of the carrier frequency of transmission signal D3, whose phase is matched to the clock signal $\phi 3$.

As described above, in the signal extraction means 8 of this embodiment, the clock signal $\phi 3$ is able to be easily made from the clock signal $\phi 4$. In the embodiment shown in FIG. 1, the clock signal of the frequency twice as much as that of the clock signal $\phi 4$ in order to produce the clock signal $\phi 2$. Consequently, the correlator according to this embodiment is able to reduce consumed power still more than the correlator shown in FIG. 1.

Now, still another embodiment of the correlator according to this invention will be described.

Figure 5:
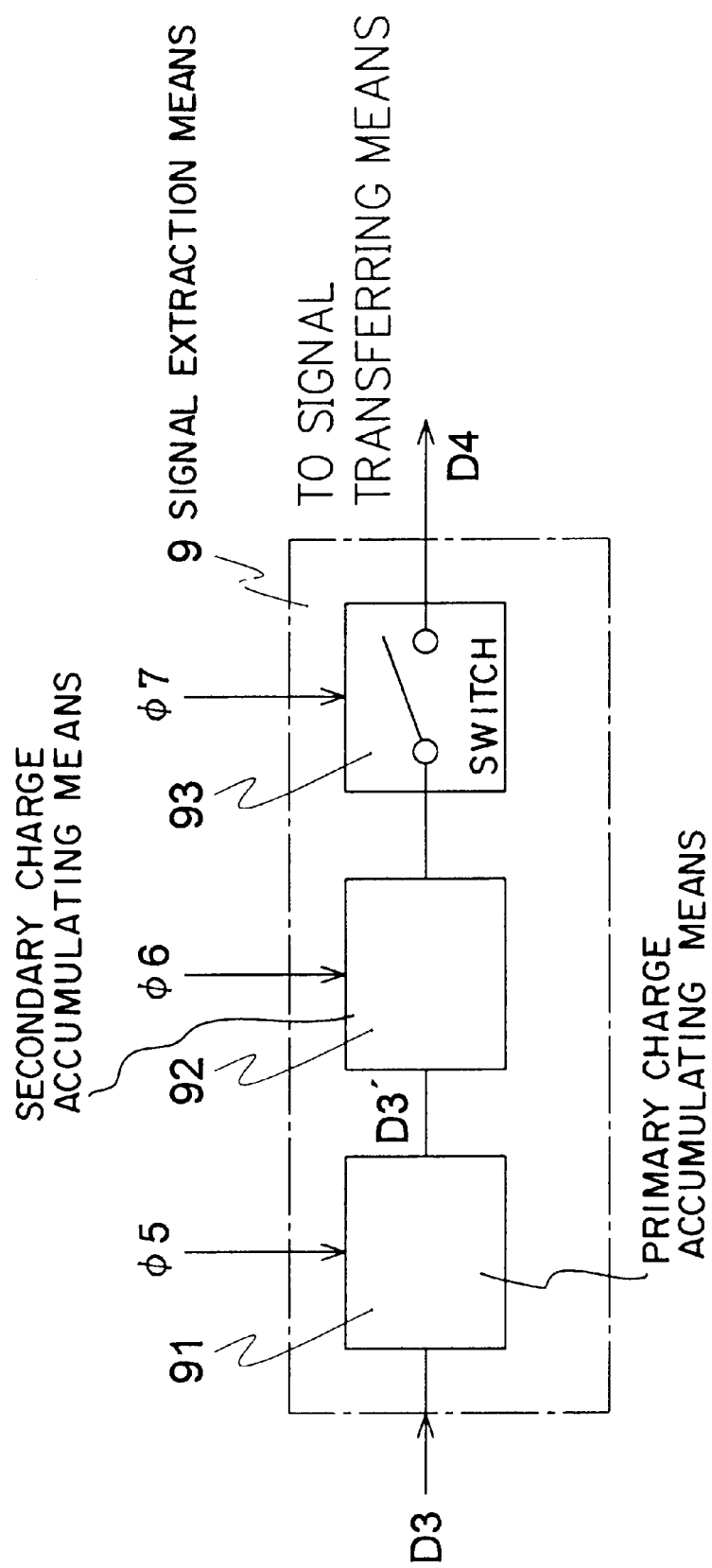
FIG. 5 is a block diagram showing a signal extraction means in another embodiment of a correlator according to this invention.
Figure 6:
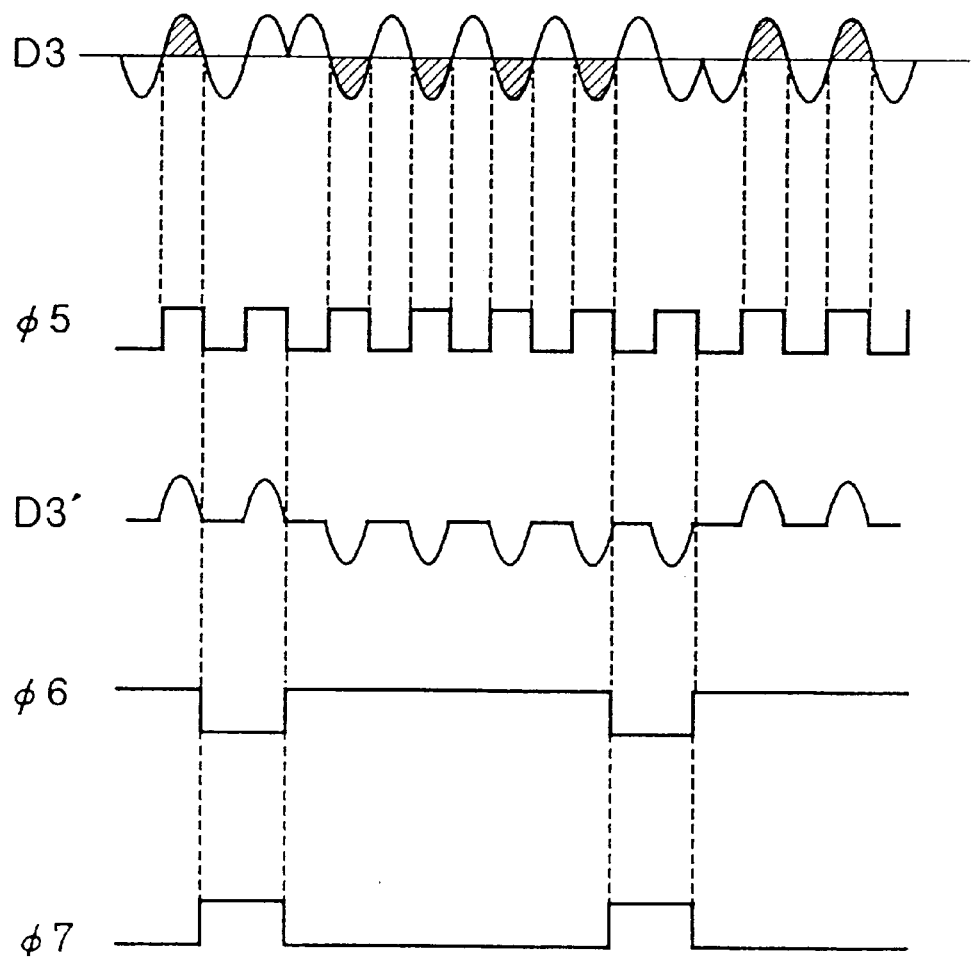
FIG. 6 is a timing chart showing waveforms for explaining the operation of the signal extraction means shown in FIG. 5.

FIG. 5 is a block diagram showing the signal extraction means 9 in another embodiment of the correlator according to this invention. FIG. 6 is a timing chart showing waveforms for explaining operation of the signal extraction means shown in FIG. 5. The signal extraction means 9 comprises a primary electric charge accumulating means 91 controlled by the clock signal $\phi 5$, a secondary electric charge accumulating means 92 controlled by the clock signal $\phi 6$, and a switch 93 controlled by the clock signal $\phi 7$. In this embodiment, as shown in FIG. 6, the frequency of the clock signal $\phi 5$ is set to the same frequency as the carrier frequency f3 of the transmission signal D3. In addition, voltage as much as one half cycle of each cycle of transmission signal D3 is charged at the primary electric charge accumulating means 91. In the primary electric charge accumulating means 91, because the phase of the transmission signal D3 is reversed at the edge portion of the PN code data D2, if the chip of the PN code data D2 is changed from "1" to "0" or "0" to "1", the polarity of electric charge to be accumulated is changed. The output of the primary electric charge accumulating means 91 is shown with symbol "D3'" in the drawing.

The secondary electric charge accumulating means 92 accumulates (integrates) each electric charge of transmission signal D3 taken in the primary electric charge accumulating means 91 by the clock signal $\phi 6$ by a plurality of pieces (number 2 or more and at least 1 less than the maximum cycle number of transmission signal D3 generated within one chip of PN code data D2). The switch 93 sends out at a sitting the electric charge accumulated at the secondary electric charge accumulating means 92 at a stroke to the signal transferring means by the clock signal $\phi 7$ whose phase is reversal to that of the clock signal $\phi 6$, as the signal D4. The frequencies of the clock signal $\phi 6$ and clock signal $\phi 7$ are same as the chip rate of the PN code data D2, but for the clock signal $\phi 6$, the duty is, for example, 31/32, and for the clock signal $\phi 7$, it is, for example, the reciprocal (1/32). In addition, the phases of the clock signal $\phi 6$ and the clock signal $\phi 7$ are the phases that matche the change point of the chip of the PN code data D2.

The signal extraction means 9 in this embodiment takes in signals equivalent to each half cycle of a plurality of cycles of the transmission signal D3 in order to take in the PN code data D2 equivalent to one chip. This practically means that the mean value of transmission signal D3 is taken in, and the S/N is improved.

In each of the above-mentioned embodiments, because the transfer efficiency is not perfect 1 at the signal transferring means of the correlator, the transfer signal is successively attenuated more in subsequent stages than in the advanced stages of the signal transferring means. Therefore, in such case, by weighting the coefficient set to each multiplier of the multiplication means more heavily than original coefficients as the cell of the signal transferring means is located more distant in the subsequent stages, the attenuation of the said transfer signal is compensated for. For example, if the number of cells is 10 and coefficient (PN code) to be originally set to the multiplier 2a is "1, −1, 1, 1, −1, −1, 1, 1, −1, 1", the absolute value of the coefficient is successively increased as "1, −1, 1, 1, −1, −1, 1, 1.1, −1.2, 1.3".

Now, description is made on simulation results using a correlator shown in FIG. 1. The carrier frequency of the transmission signal D3 is set to 3 GHz, the chip rate of PN code data D2 is set to 100 Mcps, CCD is used for the signal transferring means 1, the number of cells 1a in CCD is set to 32, the PN code is set to an orthogonal GOLD code (particularity, 01110011000001101110101011100010), the transfer efficiency of the signal transferring means 1 is set to 1, and BPSK is used for primary modulation. The clock signal φ2 for controlling the signal extraction means 6 is set to a clock signal of pulse width to be ⅙ ns and frequency to be 100 MHz, and the clock signal φ1 of the signal transferring means 1 is set to the clock signal of frequency to be 100 MHz and duty to be 50. The transmitted baseband data D1 is set to "101".

Figure 7:
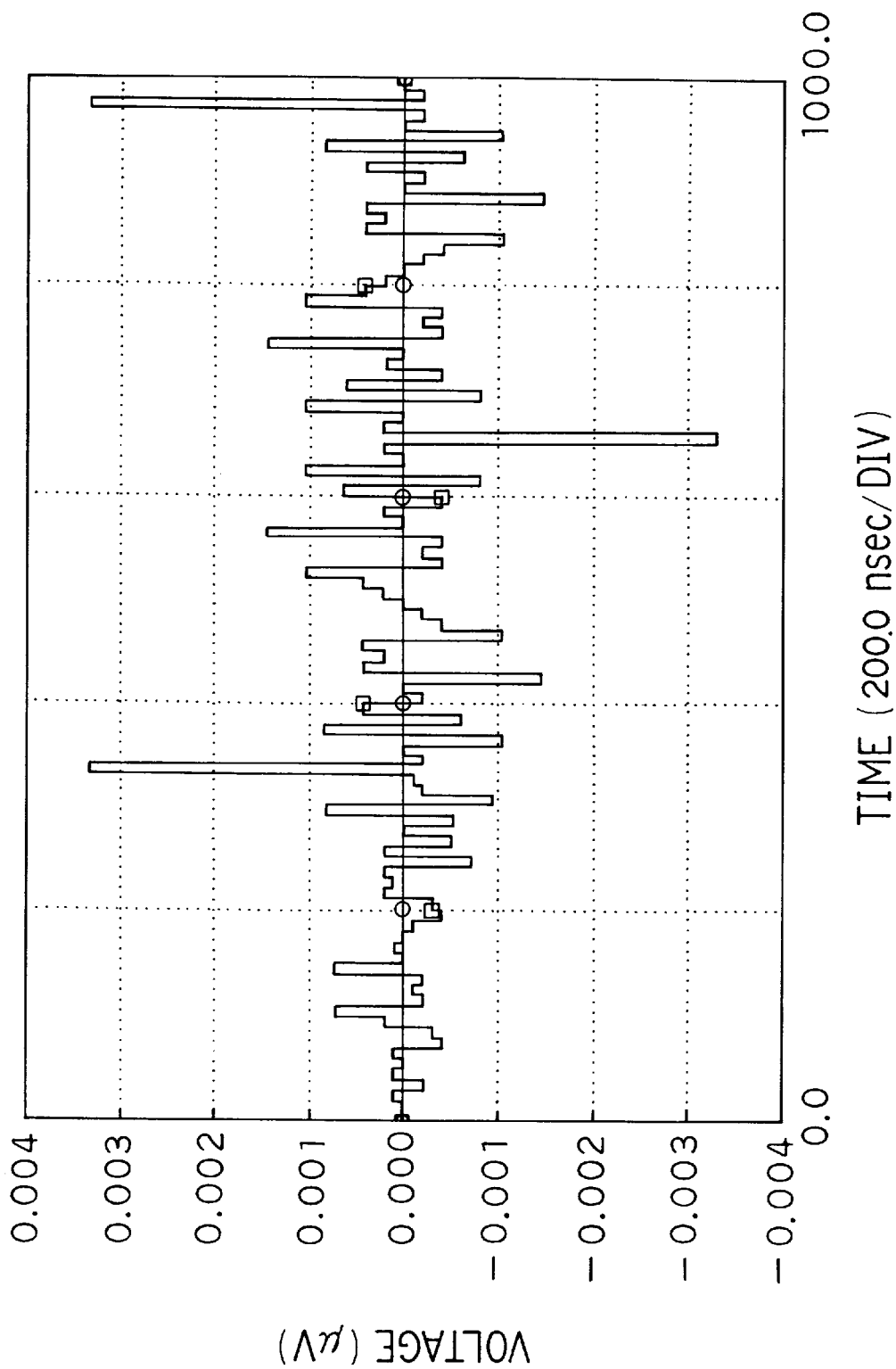
FIG. 7 is a graph showing the results of simulation using the correlator shown in FIG. 1.

FIG. 7 is a graph showing results of simulation using the correlator shown in FIG. 1. On the output side of the adder 3, as shown in FIG. 7, a correlation peak appeared at timing equivalent to cycle of bit rate. For "1" of the transmitted baseband data D1, an upward peak appears, while for "0", a downward peak appears. In this way, a data "101" corresponding to "101" of the transmitted baseband data D1 is obtained from the correlator.

On the other hand, in the spread spectrum communications, investigation has been made on CDMA (code division multiple access), and in order to provide a large number of channels, it is necessary to extend the chip length. Therefore, the consumed power was calculated when the chip length is 1024 chips, carrier frequency of the transmission signal D3 is 3 GHz, chip rate of PN code data D2 is 100 Mcps, the signal transferring means 1 is CCD formed by using GaAs, and the number of cells in CCD is 1024. When the transmission signal D3 is taken in as it is without carrying out frequency conversion by a down converter, etc. as in the case of a conventional method, the frequency of the clock signal φ1 for transferring must be 3 GHz, and the number of CCDs is 30, each one of which contains 1024 cells per CCD (total number of cells is 30,720), are required, and the consumed power is 55 W. On the other hand, as in the case of this invention, when a signal extraction means 6 is provided on the input side of the signal transferring means 1, and only the data equivalent to one half cycle of one data of transmission signal D3 is designed to be extracted and sent to the signal transferring means 1, 100 MHz only, same as the chip rate of PN code data D2, are required for the frequency of the clock signal φ1 of the signal transferring means 1 and only 1024 cells are sufficient for the number of cells in CCD of the signal transferring means, and the consumed power has been able to be greatly reduced to about 62 mW.

Now, description will be made on still another embodiment of the correlator according to this invention.

Figure 8:
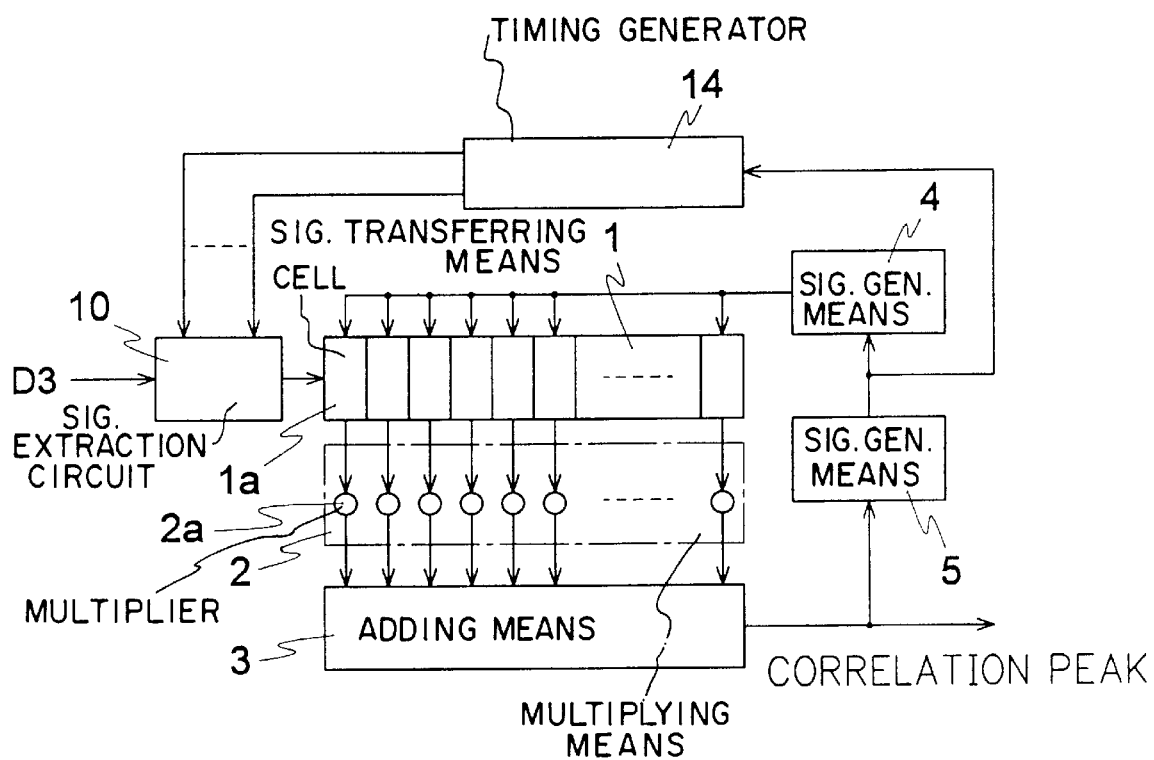
FIG. 8 a block diagram showing another embodiment of a correlator according to this invention.

FIG. 8 is a block diagram showing still another embodiment of the correlator according to this invention. Like elements shown in FIG. 19 are given like reference characters. In this embodiment, a signal extraction means 10 is provided in the stage before a signal transferring means 1, and the signal corresponding to PN code data D2 is extracted from transmission signal D3 in the signal extraction circuit 10 and is sent to the signal transfer means 1. That is, the signal extraction circuit 10 takes in the timing signal from the timing generator 14 operated by the synchronous signal obtained in the synchronous signal generator means 5, gets together the phase information which the transmission signal D3 has in one chip to form into one information signal, and outputs it as a signal corresponding to PN code data D2.

Now one embodiment of the signal extraction circuit according to this invention will be described.

Figure 9:
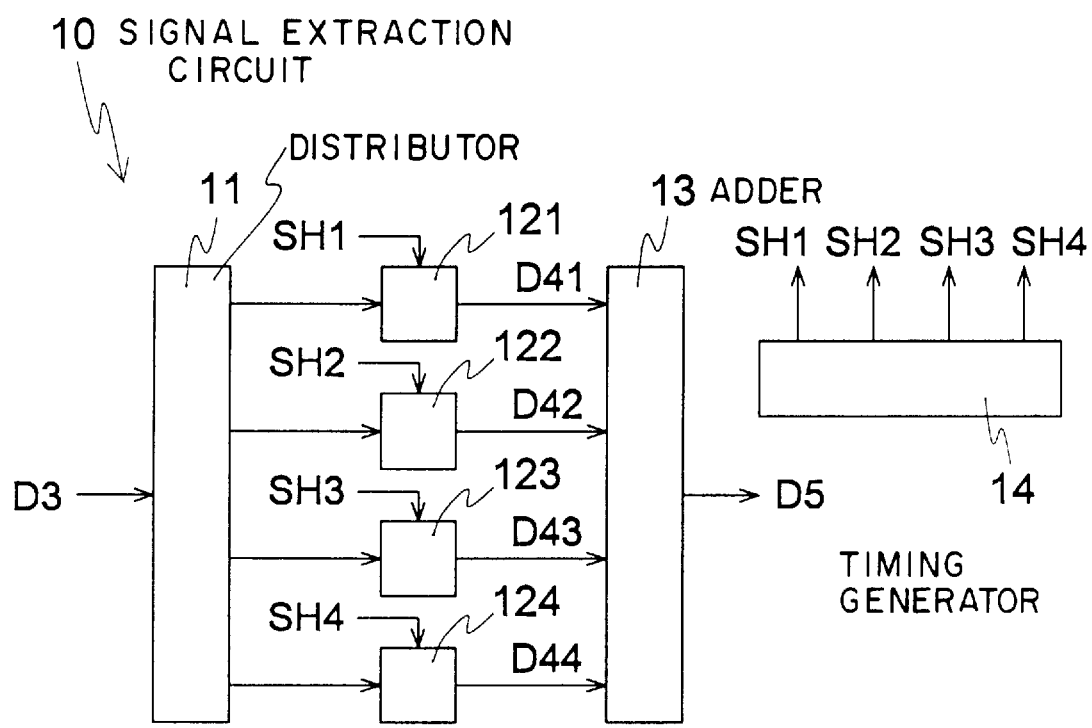
FIG. 9 is a block diagram showing one embodiment of a signal extraction circuit according to this invention.

FIG. 9 is a block diagram showing a one embodiment of a signal extraction circuit according to this invention. In FIG. 9, numeral 11 is a distributor comprising strip lines for distributing transmission signal D3 to a plurality of paths, numerals 121 to 124 are sample and hold circuits (S/H) for outputting the inputted transmission signal D3 as it is when sample signals SH1 to SH4 are active and for holding and outputting transmission signal D3 when the sample signals are changed over from active to non-active, numeral 13 is an adder for adding signals D41 to D44 outputted from each sample and hold circuit 121 to 124 and outputting as addition signal D5. The timing generator 14 generates sample signals SH1 to SH4.

Figure 10:
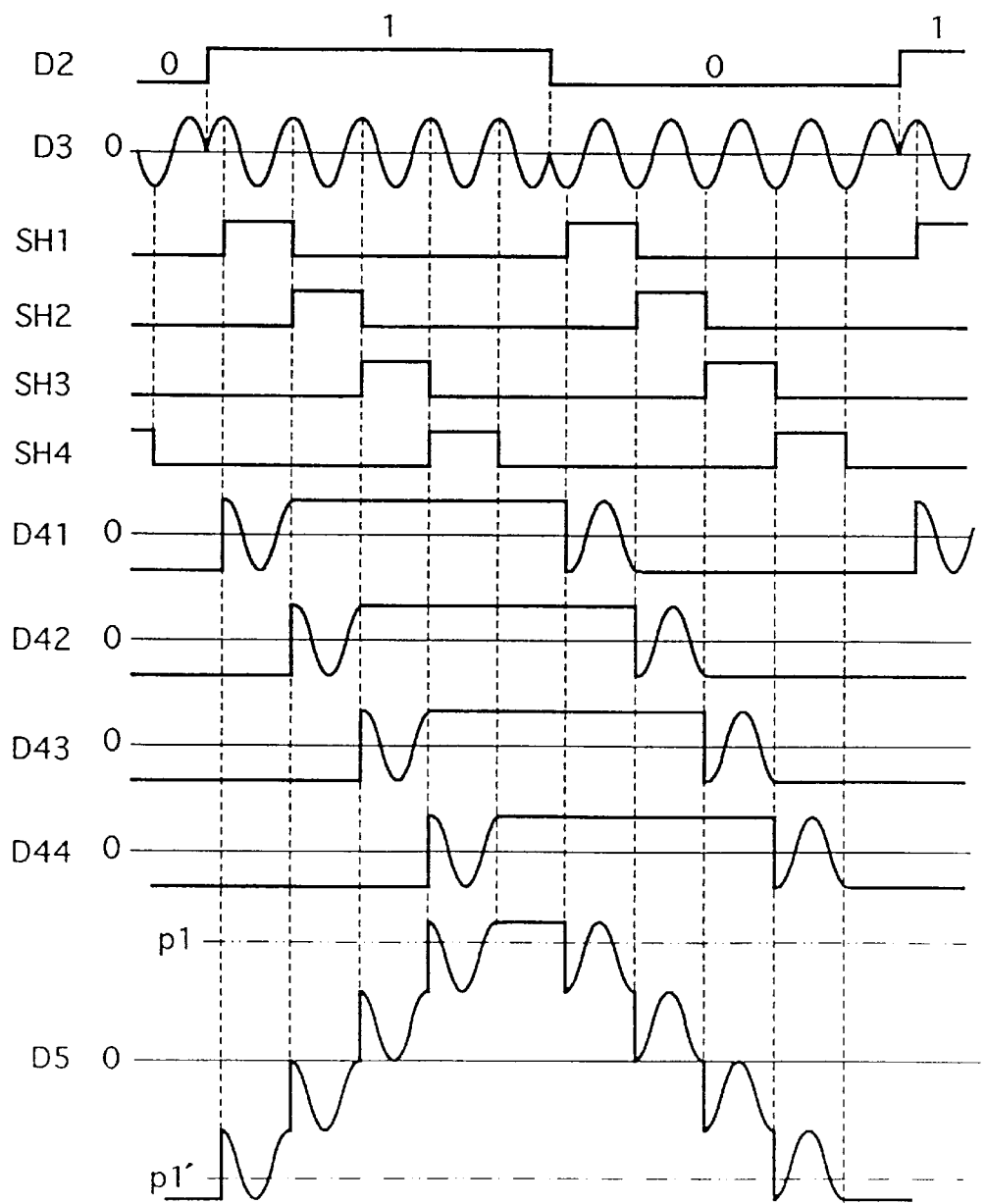
FIG. 10 is a timing chart showing waveforms for explaining the operation of the signal extraction circuit shown in FIG. 9.

FIG. 10 is a timing chart showing waveforms for explaining operation of the signal extraction circuit 10 shown in FIG. 9. In this embodiment, for simplifying description, transmission signal D3 is set to 5 cycles per 1 chip, and the number of sample and hold circuits are four designated as symbols 121 to 124. The cycle of sample signals SH1 to SH4 is equal to the cycle of 1 chip of PN code data D2, and the signals become active ("1") only in the period of one cycle of transmission signal D3 every one period, and become inactive ("0") in other period. The sample signals SH1 to SH4 have the phase successively shifted by the period of one cycle of transmission signal D3.

Consequently, the addition signal D5 which has signals D41 to D44 outputted from sample and hold circuits 121 to 124 added at an adder 13 has ripples of transmission signal D3 as shown in FIG. 10 but exhibits a positive peak value in the timing corresponding to "1" of the PN code data D2, and in the timing corresponding to "0", it exhibits a negative peak value. The phase of addition signal D5 is slightly shifted with respect to the phase of the PN code data D2. Based on the above, for example, if a comparator in which absolute value of positive threshold value p1 or negative threshold value p1' is set to a slightly smaller value than absolute value of the positive peak value or negative peak value of addition signal D5 is provided in subsequent stage of the adder 13, it is possible to obtain positive peak and negative peak signals corresponding to "1" and "0" of the PN code data D2. It is also possible to interpose an integration circuit between the comparator and the adder 13 to remove ripple components.

In the above description, for simplification, description is made on the case when transmission signal D3 is 5 cycles per 1 chip of PN code data D2, but in the case of n cycle, it is possible to provide n pieces of sample and hold circuits, at maximum. In this event, the positive and negative peak values of the output signals of adder 13 are n times absolute value of positive peak value of transmission signal D3 and −n times the absolute value of the negative peak value, if an allowance is provided for the power supply voltage range. By the above-mentioned description, sample and hold signals SH1 to SH4 are designed to hold the positive or negative peak value of the transmission signal D3, but it is only necessary to hold the point other than zero cross point, that is optional positive or negative level of transmission signal D3. And the period in which the sample and hold signals SH1 to SH4 become active is not limited to the period equivarent to one cycle of transmission signal D3 but may be a shorter period. In this way, ripple component of addition signal D5 can be reduced.

Now the other embodiment of the signal extraction circuit according to this invention is described.

FIG. 11 is a block diagram showing the other embodiment of signal extraction circuit 10' according to this invention. The signal extraction circuit shown in FIG. 11 is achieved by adding sample and hold circuits 121' to 124', adder 13', and differential amplifier 15, and the distributor 11 replaced by a distributor 11' with 8 distributing capabilities. Under this embodiment, by the timing generator 14' controlled by the output signal of the synchronous signal generator means 5 of FIG. 8, the phase of sample signals SH1' to SH4' of sample and hold circuits 121' to 124' is delayed by one half period of the transmission signal D3 from the phase of sample signals SH1 to SH4.

Consequently, signals D41' to D44' obtained by added sample and hold circuits 121' to 124' are signals with the phase inverted by 180° with respect to phase of signals D41 to D44 obtained in the sample and hold circuits 121 to 124. Consequently, addition signal D5 obtained from adder 13 and addition signal D5' obtained from adder 13' are signals with the phase shifted by 180°. Because the difference between addition signal D5 and addition signal D5' is operated in the differential amplifier 15. Therefore, absolute value of addition signal D5 is added to absolute value of addition signal D5', practically. Consequently, in the signal extraction circuit 10' of this embodiment, it is possible to obtain a signal D6 of a level double that of signal D5 obtained in signal extraction circuit 10 shown in FIG. 9, improving the S/N double that of signal extraction circuit 10 shown in FIG. 9.

Now another embodiment of the signal extraction circuit according to this invention will be described.

Figure 12:
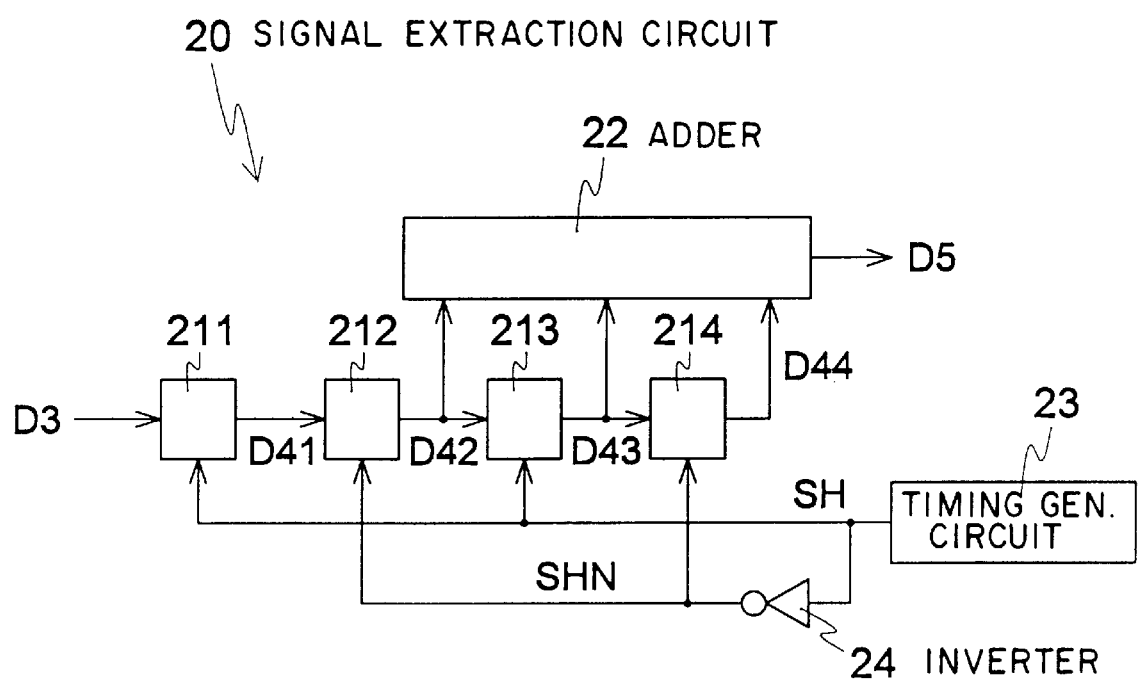
FIG. 12 is a block diagram showing another embodiment of a signal extraction circuit according to this invention.
Figure 13:
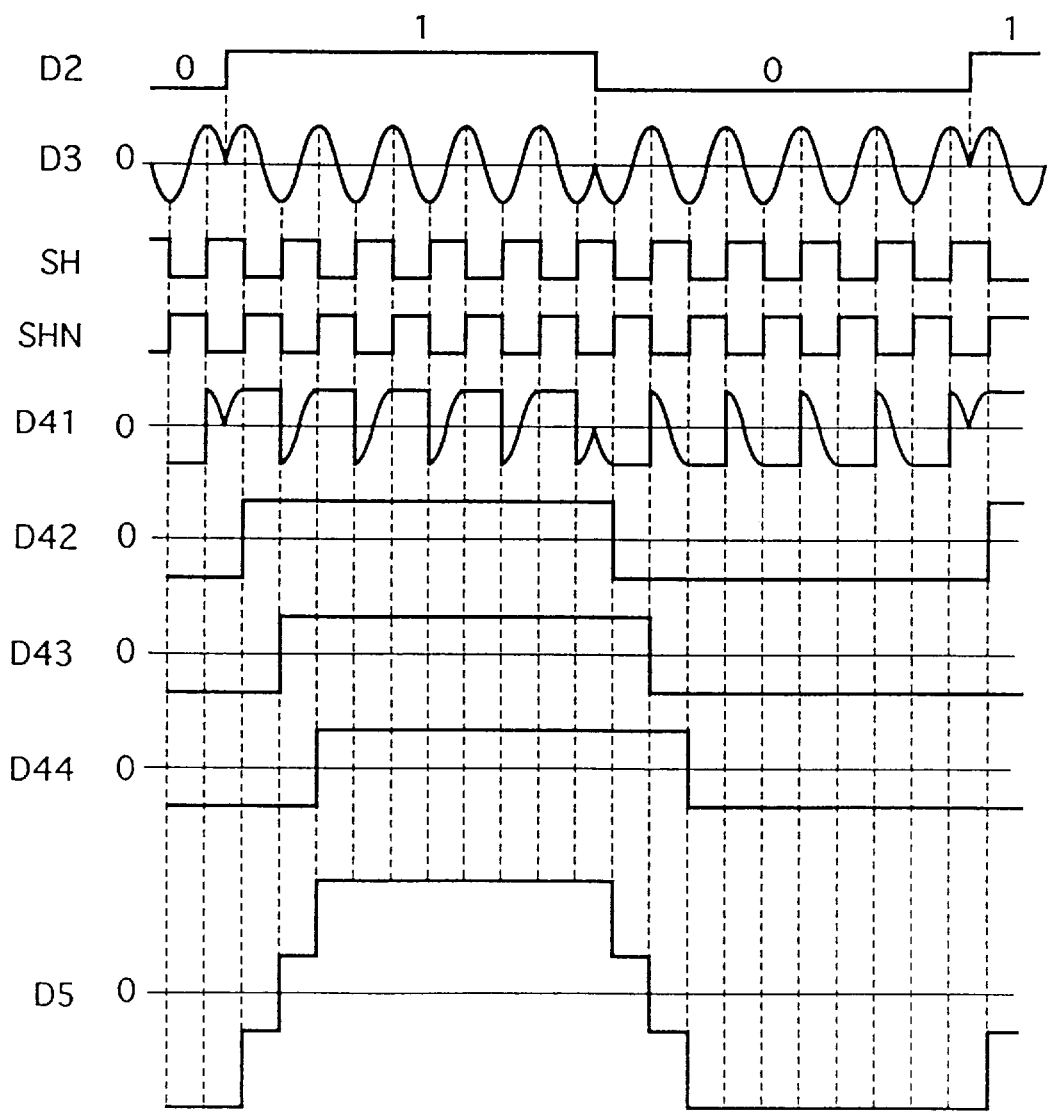
FIG. 13 is a timing chart showing waveforms for explaining the operation of the signal extraction circuit shown in FIG. 12.

FIG. 12 is a block diagram showing another embodiment of the signal extraction circuit 20 according to this invention. FIG. 13 is a timing chart showing waveforms for explaining the operation of the signal extraction circuit shown in FIG. 12. The signal extraction circuit 20 has sample and hold circuits 211 to 214 successively connected by cascade connection with respect to the input portion of transmission signal D3, and the output signals of the sample and hold circuits 212 to 214 of the second to fourth stages of them are added in the adder 22 to output. In FIG. 12, numeral 23 is a timing generator circuit for generating a sample signal SH which has the same frequency as that of transmission signal D3 and whose duty is 50, and is controlled by the output signal from the synchronous signal generator means 5 of FIG. 8. In addition, numeral 24 is an inverter to generate an inverted sample signal SHN whose phase is inverted by 180° with respect to the sample signal SH.

The odd number sample and hold circuits 211, 213 become active when the sample signal SH is "1", and inactive when "0". The even number sample and hold circuits 212, 214 become active when the inverted sample signal SHN is "1", and inactive when "0".

Consequently, if leading edge and trailing edge of sample signal SH are set to correspond to the positive and negative peak values of transmission signal D3 as shown in FIG. 13, to the output of sample and hold circuit 211 on the first stage, a signal sampling and holding the transmission signal D3 is outputted, but from sample and hold circuits 212 to 214 of the next stage on, a rectangular signal with the phase successively delayed by one half cycle of the sample signal SH is outputted. The addition signal D5 obtained by adding the outputs of these sample and hold circuits 212 to 214 by the adder 22 becomes a signal corresponding to the PN code data D2.

By the way, the sample and hold circuit should not be limited to four. Though transmission signal D3 provides 5 cycles per 1 chip of the PN code data D2, but 6 or more sample and hold circuits may be used. Under the above description, the positive or negative peak value is of transmission signal D3 designed to be held by the sample and hold signal SH in the sample and hold circuit 211 as the first stage, but any optional positive or negative level other than the zero cross point of transmission signal D3 may be required to be held.

Now, still another embodiment of the signal extraction circuit according to this invention will be described.

Figure 14:
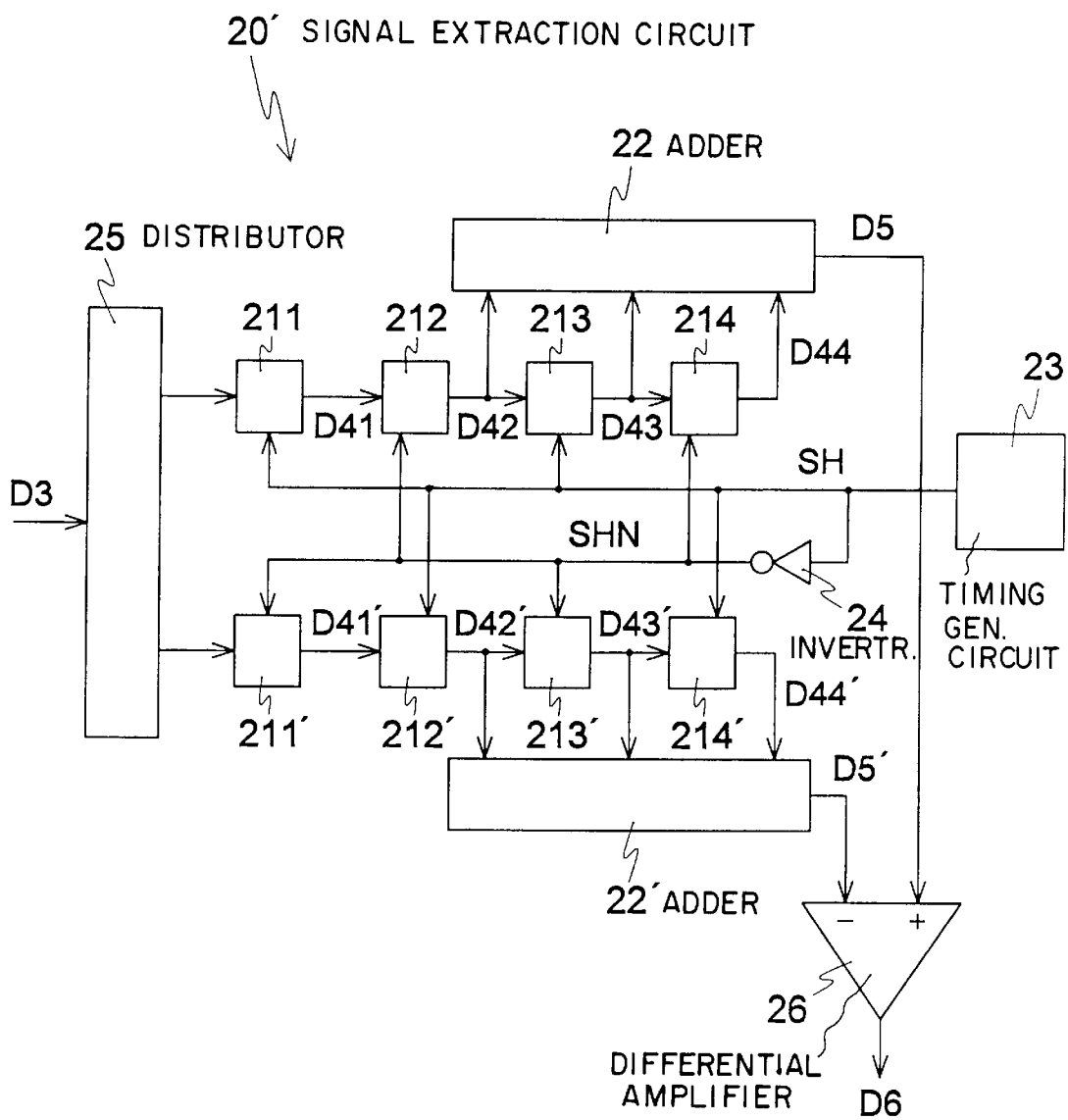
FIG. 14 is a block diagram showing still another embodiment of a signal extraction circuit according to this invention.

FIG. 14 is a block diagram showing still another embodiment of signal extraction circuit 20' according to this invention. The signal extraction circuit 20' has a distributor 25 provided for distributing transmission signal D3 in two ways with respect to signal extraction circuit 20 shown in FIG. 12, and inputs one output of the distributor 25 to the circuit connecting the sample and hold circuits 211 to 214 and the other output of the distributor 25 to the circuit connecting the sample and hold circuits 211' to 214', respectively by means of cascade connection. In addition, outputs of the sample and hold circuits 212 to 214 are designed to be added by the adder 22 as in the case of signal extraction circuit 20 shown in FIG. 12, the outputs of the sample and hold circuits 212' to 214' are designed to be added at the adder 22' newly provided, and differential signal D6 of additions signals D5, D5' outputted from both adders 22, 22' is designed to be obtained at the differential amplifier 26.

In the signal extraction circuit 20', sample signal SH is inputted to sample and hold circuits 211, 213, 212', 214', while inverted sample signal SHN is inputted to sample and hold circuits 212, 214, 211', 213'.

Consequently, as in the case of the signal extraction circuit explained using FIG. 12 and FIG. 13, from adder 22, addition signal D5 corresponding to PN code data D2 is obtained, but from adder 22', addition signal D5' whose phase is inverted by 180° with respect to the phase of addition signal D5 obtained from the other adder 22 is obtained. And in the differential amplifier 26, the difference between the addition signals D5, D5' is operated, and practically, the absolute value of addition signals D5 is added to absolute value of addition signal D5'. That is, in the signal extraction circuit 20' according to this embodiment, differential signal D6 of a level double that of differential signal obtained in signal extraction circuit 20 shown in FIG. 12 can be obtained, improving S/N twice as much as that of the signal extraction circuit shown in FIG. 12.

Now, still another embodiment of the signal extraction circuit according to this invention is described.

Figure 15:
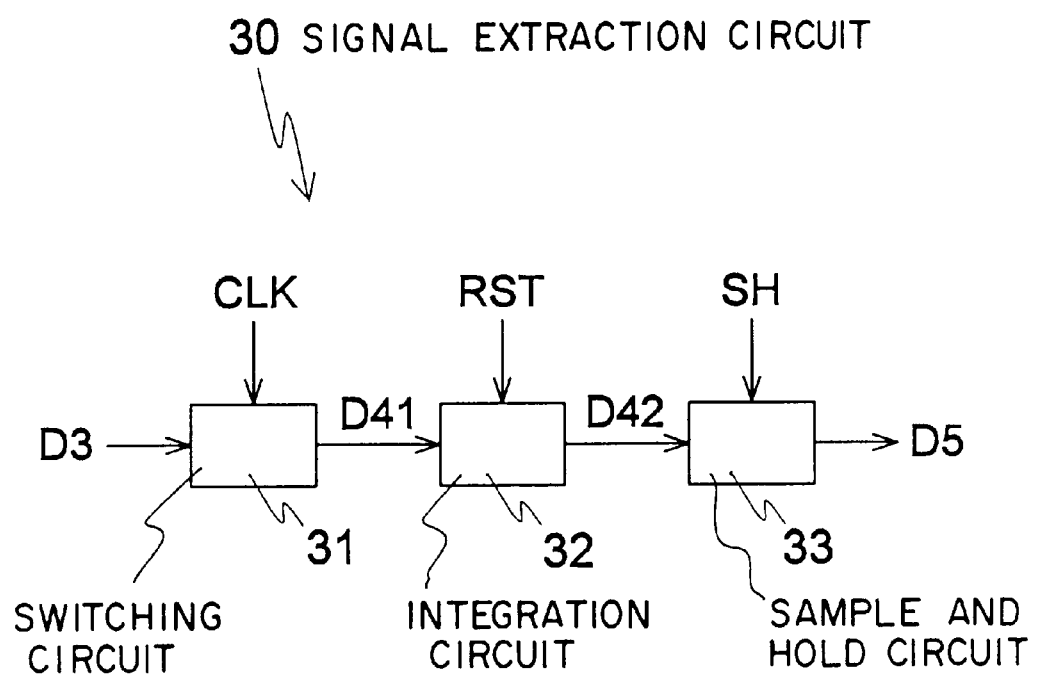
FIG. 15 is a block diagram showing even another embodiment of a signal extraction circuit according to this invention.
Figure 16:
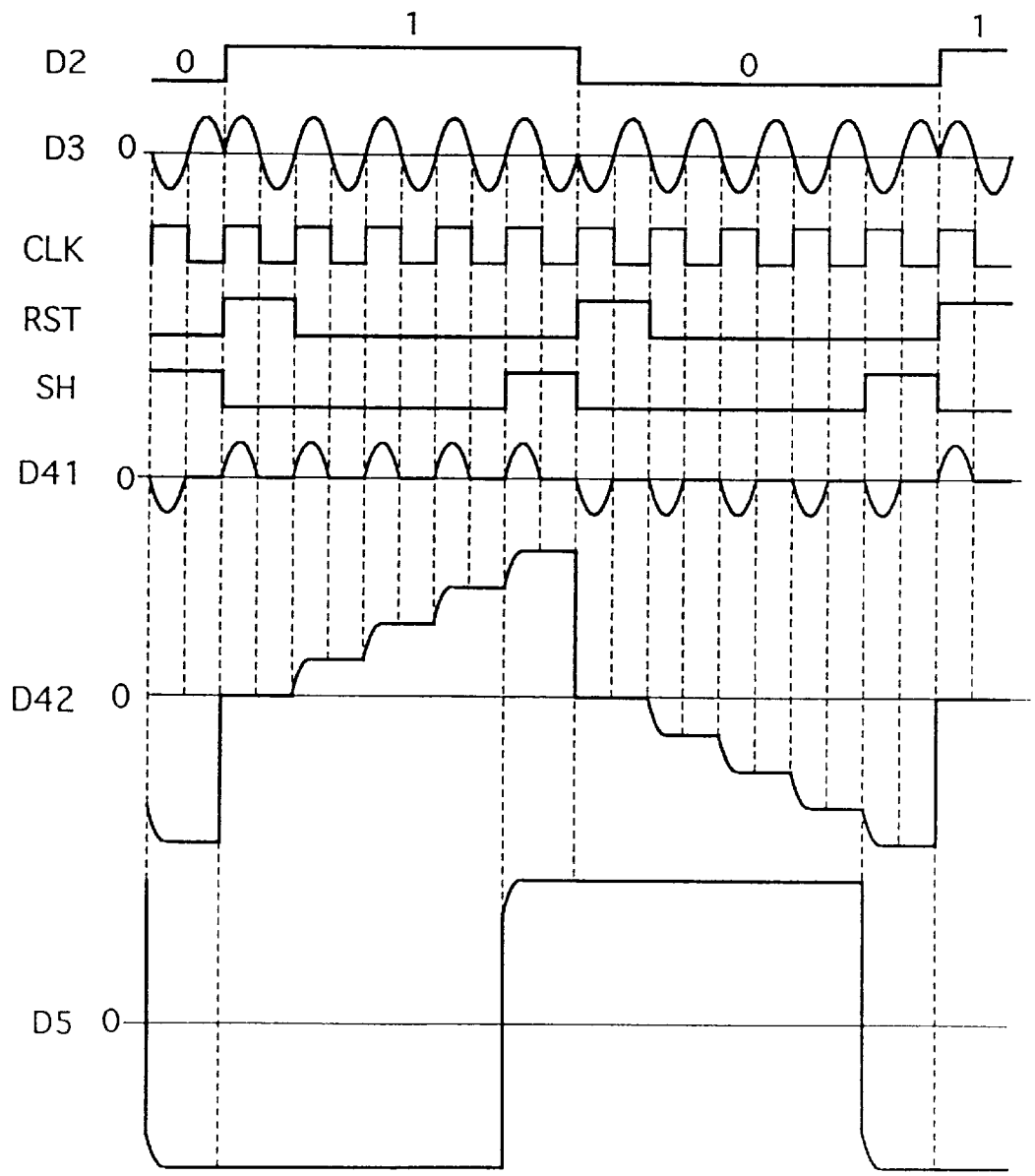
FIG. 16 is a timing chart showing waveforms for explaining the operation of the signal extraction circuit shown in FIG. 15.

FIG. 15 is a block diagram showing still another embodiment of signal extraction circuit 30 according to this invention. FIG. 16 is a timing chart showing waveforms for explaining the operation of the signal extraction circuit shown in FIG. 15. The signal extraction circuit 30 connects with a switching circuit 31 by cascade connection, integration circuit 32, and sample and hold circuit 33 with respect to the input portion inputted the transmission signal D3. The switching circuit 31 is controlled by the clock signal CLK which has the same frequency as that of the transmission signal D3 and whose duty is 50. The switching circuit 31 passes the input signal (transmission signal D3) when the clock signal CLK is "1". The integration circuit 32 integrates the signal D41 from the switching circuit 31 until the integration circuit 32 is reset by the reset signal RST which becomes "1" for every period corresponding to chip rate of the PN code data D2, that is, only for the period equivalent to one cycle of the transmission signal D3 from start timing of every one chip. The sample and hold circuit 33 is controlled by sample and hold signal SH similar to reset signal RST, and takes in and holds the data just before resetting the integration circuit 32. The clock signal CLK, reset signal RST, and sample and hold signal SH are generated based on synchronous signal given by synchronous signal generator means 5 shown in FIG. 8, respectively.

Based on the above, in the signal extraction circuit 30, as shown in FIG. 16, if the phase is determined in such a manner to allow leading/trailing edges of clock signal CLK to correspond to zero cross point of transmission signal D3, signal D41 equivalent to positive (or negative) one half cycle of transmission signal D3 is extracted in the switching circuit 31 and integrated in the integration circuit, and signal D42 integrated just before the integration circuit 32 is reset is extracted to the sample and hold circuit 33 and outputted to the subsequent stage as an addition signal D5. Consequently, the addition signal D5 becomes a signal of reversed phase corresponding to "1" or "0" of the PN code data D2.

In the above description, in the switching circuit 31, a signal equivalent to positive or negative one half cycle of the transmission signal D3 is accurately taken in by the clock signal CLK, but this one half cycle to be taken in may be a signal which changes from positive to negative or negative to positive. However, the taking-in start level and taking-in end level shall not be same in terms of positive and negative.

Now, description will be made on yet still another embodiment of a signal extraction circuit according to this invention.

Figure 17:
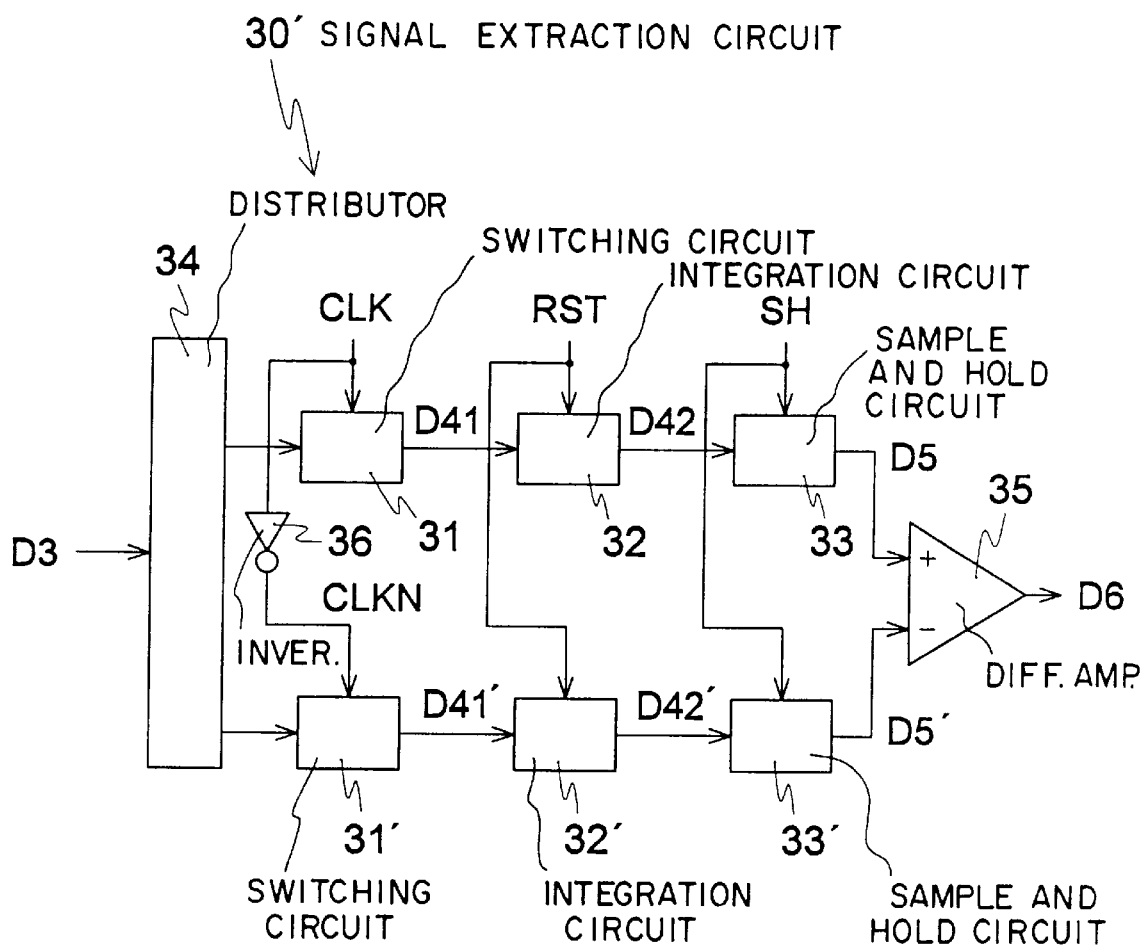
FIG. 17 is a block diagram showing yet still another embodiment of a signal extraction circuit according to this invention.
Figure 18:
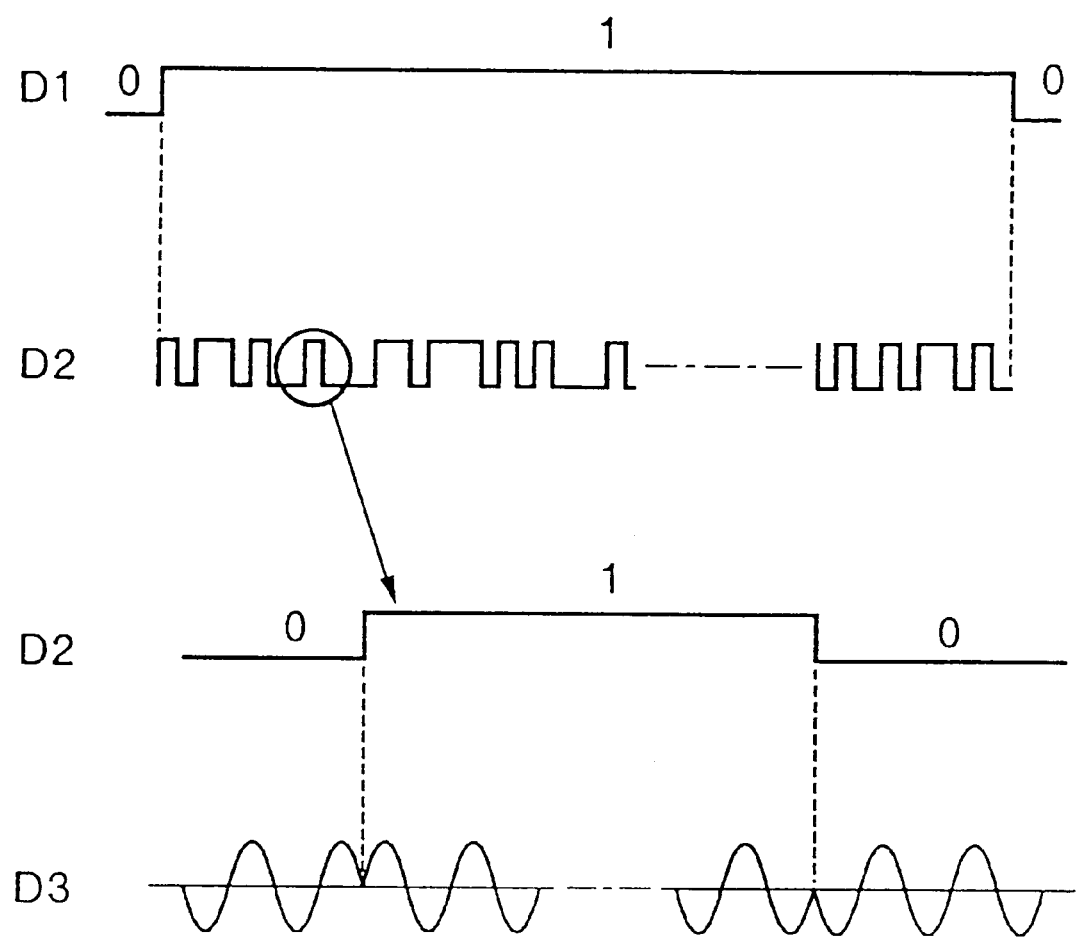
FIG. 18 is a schematic view showing waveforms of signals to be processed on the transmitting side in the spread spectrum communications.

FIG. 17 is a block diagram showing yet still another embodiment of a signal extraction circuit 30' according to this invention. The signal extraction circuit 30' has a distributor 34 provided for distributing transmission signal D3 in two ways with respect to the signal extraction circuit 30 shown in FIG. 15, and inputs one output of the distributor 34 to the connected circuit by cascade connection comprising a switching circuit 31, integration circuit 32, and the sample and hold circuit 33 which is configured in the same way as in the circuit shown in FIG. 15, and the other output of the distributor 34 to the connected circuit by cascade connection comprising a switching circuit 31', integration circuit 32', and the sample and hold circuit 33', respectively, and the addition signals D5, D5' outputted from both sample and hold circuits 33, 33' are inputted to the differential amplifier 35. The switching circuit 31' carries out switching operation by the inverted clock signal CLKN in which the clock signal CLK is inverted by an inverter 36.

Consequently, in the said signal extraction circuit 30', the signal D41 for which transmission signal D3 is taken in by a switching circuit 31 and outputted has the polarity inverted with respect to that of the signal D41' taken in and outputted at the switching circuit 31'. Consequently, the polarities of signals D42, D42' integrated and outputted at the integration circuits 32, 32' are inverted to each other. And the difference between the addition signals D5, D5' outputted from the sample and hold circuits 33, 33' which samples and holds these signals D42, D42' is computed by a differential amplifier 26. As a result, practically, absolute value of addition signals D5 is added to absolute value of addition signal D5' at the differential amplifier 26. That is, the signal D6 obtained at the signal extraction circuit 30' in the embodiment provides a level twice as much as that of the signal obtained at signal extraction circuit 30. Consequently, the signal extraction circuit according to this embodiment improves S/N twice as much as that of the signal extraction circuit shown in FIG. 15.

The signal extraction circuit in each of the above-mentioned embodiments applies to the correlator in spread spectrum communications and PN code data D2 is obtained from transmission signal D3, but it shall not be limited to this but the signal extraction circuit according to this invention is able to be applied to all the signal extraction circuits of the type in which the phase information is directly extracted from the input signal wherein two values of code data is expressed by the phase of a plurality of cycles.

According to this invention, since the transmission signal to be inputted does not need to be frequency-converted by a down converter, etc., no strain problem occurs. In addition, since the data of the speed corresponding to the PN code data can be extracted from signal extraction circuit, it is possible to operate the signal transferring means on the subsequent stage of signal extraction circuit at the same speed as the chip rate of the PN code data. Consequently, it is possible to allow the number of cells of the signal transferring means to correspond to the chip length of the PN code data, achieving the reduction of consumed power and downsizing the circuit. When the transmission signal to be inputted is converted into the digital signal, because there is a limitation in the number of bits of A/D converter in the case of high frequency and low bit number is inevitable, and the dynamic range becomes small. However, this invention can handle the analog signal as it is, and has no such problem. Furthermore, it is possible to realize a correlator strong in noise and phasing by extracting a plurality of signals equivarent to one half cycle of the transmission signal to be inputted and handling its mean signal. In addition, by weighting the coefficient of the multiplier, it is possible to compensate for a decrease in the transfer efficiency of the cell of the signal transferring means. The signal transferring means can be configured with a sample and hold circuit, digital shift register, etc. in addition to CCD, and its application range is wide.

In addition, when this invention is applied to a correlator which achieves correlation with the PN code in the spread spectrum communications, because it is possible to directly extract the speed data corresponding to the PN code data from the signal extraction circuit, it is possible to operate the signal transferring means on the subsequent stage of the signal extraction circuit at the same speed as the chip rate of the PN code data. Consequently, the number of cells of the signal transferring means is allowed to correspond to the chip length of the PN code data, achieving reduction of consumed power and downsizing the circuit.

Though several embodiments of the present invention are described above, it is understood that the present invention is not limited only to the above-mentioned various changes and modifications may be made in the invention without departing from the spirit and scope thereof.

What is claimed is:

1. A correlator comprising:
   a signal extraction means for directly extracting a phase information from an input signal which expresses two values of code data by each phase of a plurality of cycles;

a signal transferring means for transferring the phase information obtained in the signal extraction means;

a multiplying means having a plurality of multipliers wherein fixed coefficients are multiplied by signals obtained in each cell of the signal transferring means; and an adding means for adding results obtained in each multiplier of the multiplying means.

2. The correlator of claim 1, wherein the signal extraction means executes either of a step for extracting and outputting a signal of half cycle of a signal in every one period of input data, the signal expressing two values of code data, and a step for extracting signals of each half cycle of a plurality of signals in one period of an input data to collectively output the signals, each of the signals expressing two values of code data.

3. The correlator of claim 1, wherein a frequency of a clock signal for outputting the signal from the signal extraction means is the same frequency of a clock signal for operating the signal transferring means, for extracting data from the signal extraction means at the same speed as that of extracting the code data.

4. The correlator of claim 1, wherein the fixed coefficient of each multiplier of the multiplying means is weighted in accordance with a transfer efficiency of the signal transferring means.

5. A signal extraction circuit for directly extracting phase information from an input signal which expresses two values of code data by each phase of a plurality of cycles, the signal extraction circuit comprising:

a plurality of sample and hold circuits for sampling and holding separately the input signal; and an adder for adding output signals from the plurality of sample and hold circuits;

wherein a point other than a zero crossing point of the input signal is sampled and held by each of the sample and hold circuits, using each sample and hold signal which becomes active at timing shifted more than one unit, the one unit being equivalent to one cycle of the input signal; and wherein the adder generates a signal, the signal having the phase expressed by a polarity.

6. The signal extraction circuit of claim 5, wherein another signal extraction circuit having the same elements as those of the signal extraction circuit is connected in parallel with an input portion of the signal extraction circuit, the another signal extraction circuit being operated by a sample and hold signal shifting half cycle of the input signal against the sample and hold signal of the signal extraction circuit, and a difference between an output signal of the signal extraction circuit and an output signal of the another signal extraction circuit is operated and outputted to a differential amplifier.

7. A signal extraction circuit for directly extracting a phase information from an input signal which expresses two values of code data by each phase of a plurality of cycles, the signal extraction circuit comprising:

a plurality of sample and hold circuits connected with one another by a cascade connection; and an adder for adding output signals from a second stage to a final stage of the plurality of sample and hold circuits;

wherein output signals of even stages of the plurality of sample and hold circuits are operated by a sample and hold signal of which frequency is the same as of the input signal, to be sampled and held at a timing other than a zero crossing point; and wherein output signals of odd stages of the plurality of sample and hold circuits are operated by a sample and hold signal of which phase is reverse to a phase of the sample and hold signal.

8. The signal extraction circuit of claim 7, wherein another signal extraction circuit having the same elements as those of the signal extraction circuit is connected in parallel with an input portion of the signal extraction circuit, the another signal extraction circuit being operated by a sample and hold signal shifting half cycle of the input signal against the sample and hold signal of the signal extraction circuit, and a difference between an output signal of the signal extraction circuit and an output signal of the another signal extraction circuit is operated and outputted to a differential amplifier.

9. A signal extraction circuit for directly extracting a phase information from an input signal which expresses two values of code data by each phase of a plurality of cycles, the signal extraction circuit comprising:

a switching circuit opened and closed by a clock signal, a frequency of the clock signal being the same as that of the input signal, said switching circuit extracting a signal equivalent to half cycle of the input signal;

an integrator for integrating a signal outputted from the switching circuit and reset every period corresponding to a bit rate of the code data; and a sample and hold circuit for holding the signal outputted from the integrator just before resetting of the integrator.

10. The signal extraction circuit recited in claim 9, wherein another signal extraction circuit having the same elements as those of the signal extraction circuit is connected in parallel with an input portion of the signal extraction circuit, the another signal extraction circuit being operated by clock signal shifting half cycle of the input signal against the clock signal of the signal extraction circuit, and a difference between an output signal of the signal extraction circuit and an output signal of the another signal extraction circuit is operated and outputted to a differential amplifier.

11. A correlator comprising:

a signal extraction circuit for directly extracting a phase information from an input signal which expresses two values of code data by phase of a plurality of cycles, a signal transferring means for transferring the phase-information obtained in the signal extraction circuit, a multiplying means having a plurality of multipliers, fixed coefficients of said multiplier being multiplied by signals obtained in each cell of the signal transferring means;

and an adding means for adding results obtained in each multiplier of the multiplying means, wherein the signal extraction circuit is composed of a signal extraction circuit of claim 5, the sample and hold signal is generated by an output signal of the adding means.

12. A correlator comprising:

a signal extraction circuit for directly extracting a phase information from input signal which expresses two values of code data by phase of a plurality of cycles, a signal transferring means for transferring the obtained in the signal extraction circuit, a multiplying means having a plurality of multipliers, fixed coefficients of said multipliers being multiplied by signals obtained in each cell of the signal transferring means;

and an adding means for adding results obtained in each multiplier of the multiplying means, wherein the signal extraction circuit is composed of a signal extraction circuit of claim 6, the sample and hold signal being generated by an output signal of the adding means.

13. A correlator comprising:

a signal extraction circuit for directly extracting a phase information from an input signal which expresses two values of code data by phase of a plurality of cycles, a signal transferring means for transferring the phase information obtained in the signal extraction circuit, a multiplying means having a plurality of multipliers, fixed coefficients of said multipliers being multiplied by signals obtained in each cell of the signal transferring means;

and an adding means for adding results obtained in each multiplier of the multiplying means, wherein the signal extraction circuit is composed of a signal extraction circuit of claim 7, the sample and hold signal being generated by an output signal of the adding means.

14. A correlator comprising:

a signal extraction circuit for directly extracting a phase information from an input signal which expresses two values of code data by phase of a plurality of cycles, a signal transferring means for transferring the phase information obtained in the signal extraction circuit, a multiplying means having a plurality of multipliers, fixed coefficients of said multipliers being multiplied by signals obtained in each cell of the signal transferring means;

and an adding means for adding results obtained in each multiplier of the multiplying means, wherein the signal extraction circuit is composed of a signal extraction circuit of claim 8, the sample and hold signal being generated by an output signal of the adding means.

15. A correlator comprising:

a signal extraction circuit for directly extracting a phase information from an input signal which expresses two values of code data by phase of a plurality of cycles, a signal transferring means for transferring the phase information obtained in the signal extraction circuit, a multiplying means having a plurality of multipliers, fixed coefficients of said multipliers being multiplied by signals obtained in each cell of the signal transferring means;

and an adding means for adding results obtained in each multiplier of the multiplying means, wherein the signal extraction circuit is composed of a signal extraction circuit of claim 9, the clock signal being generated by an output signal of the adding means.

16. A correlator comprising:

a signal extraction circuit for directly extracting a phase information from an input signal which expresses two values of code data by phase of a plurality of cycles, a signal transferring means for transferring the phase information obtained in the signal extraction circuit, a multiplying means having a plurality of multipliers, fixed coefficients of said multipliers being multiplied by signals obtained in each cell of the signal transferring means;

and an adding means for adding results obtained in each multiplier of the multiplying means, wherein the signal extraction circuit is composed of a signal extraction circuit of claim 10, the clock signal being generated by an output signal of the adding means.

* * * * *